(12) United States Patent
Shilovitsky

(10) Patent No.: US 11,315,080 B1
(45) Date of Patent: *Apr. 26, 2022

(54) MULTI-MEMBER COLLABORATION AND DATA MANAGEMENT SYSTEM AND METHOD

(71) Applicant: Newman Cloud, Inc., Newton, MA (US)

(72) Inventor: Oleg Shilovitsky, Newton, MA (US)

(73) Assignee: Newman Cloud, INC., Newton, MA (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/176,384

(22) Filed: Oct. 31, 2018

Related U.S. Application Data

(63) Continuation-in-part of application No. 15/460,803, filed on Mar. 16, 2017, now Pat. No. 11,037,103.

(60) Provisional application No. 62/579,653, filed on Oct. 31, 2017.

(51) Int. Cl.
| | |
|---|---|
| *G06F 15/16* | (2006.01) |
| *G06Q 10/08* | (2012.01) |
| *G06F 16/00* | (2019.01) |
| *G06Q 10/10* | (2012.01) |
| *G06F 21/62* | (2013.01) |
| *G06F 21/60* | (2013.01) |
| *G06F 16/21* | (2019.01) |

(52) U.S. Cl.
CPC ......... *G06Q 10/103* (2013.01); *G06F 16/219* (2019.01); *G06F 21/604* (2013.01); *G06F 21/6227* (2013.01); *G06Q 10/101* (2013.01)

(58) Field of Classification Search
CPC .. G06Q 10/103; G06Q 10/101; G06F 16/219; G06F 21/604; G06F 21/6227
See application file for complete search history.

(56) References Cited

U.S. PATENT DOCUMENTS

| | | | | |
|---|---|---|---|---|
| 6,564,246 B1* | 5/2003 | Varma | ................... | G06Q 10/10 709/205 |
| 7,558,793 B1* | 7/2009 | Topolovac | ......... | G06Q 10/0875 |
| 7,610,312 B1* | 10/2009 | Topolovac | ........... | G06Q 10/087 |
| 7,801,916 B1* | 9/2010 | Topolovac | ......... | G06Q 10/0875 707/783 |
| 8,082,301 B2* | 12/2011 | Ahlgren | .............. | G06F 21/6218 709/204 |
| 8,103,694 B1* | 1/2012 | Topolovac | ........... | G06Q 10/087 707/786 |

(Continued)

*Primary Examiner* — Talia F Crawley

(74) *Attorney, Agent, or Firm* — Travis Lee Johnson; Ascentage Patent Law

(57) ABSTRACT

A multi-member collaboration and data management system, said system including a user rights-based project editing module that enables a first user to, based on rights assigned to the first user, edit one or more structured fields associated with a project, wherein each of the plurality of structured fields includes at least one defined property. The system of the present invention also having a user rights-based project edit update module which is configured to update at least a second user of the editing done by the first user based on rights assigned to the second user, wherein the rights of the second user are at least for the sections or fields edited by the first user; and a user update-based project version management module that saves a version of the project based on the editing done by the first user.

15 Claims, 22 Drawing Sheets

(56) References Cited

U.S. PATENT DOCUMENTS

| | | | | |
|---|---|---|---|---|
| 2002/0055886 | A1* | 5/2002 | Hinckley | G06Q 10/087 |
| | | | | 705/26.1 |
| 2003/0009410 | A1* | 1/2003 | Ramankutty | G06Q 40/04 |
| | | | | 705/37 |
| 2006/0190364 | A1* | 8/2006 | Bizovi | G06F 30/00 |
| | | | | 705/29 |
| 2009/0320035 | A1* | 12/2009 | Ahlgren | G06F 9/468 |
| | | | | 718/104 |
| 2010/0058198 | A1* | 3/2010 | Chong | G06Q 10/10 |
| | | | | 715/751 |
| 2011/0112679 | A1* | 5/2011 | Srinivasan | G06Q 10/06 |
| | | | | 700/107 |
| 2012/0278787 | A1* | 11/2012 | Chong | G06F 8/51 |
| | | | | 717/104 |
| 2015/0262124 | A1* | 9/2015 | Martinez-Ablanedo | |
| | | | | G06F 16/00 |
| | | | | 705/29 |
| 2015/0379466 | A1* | 12/2015 | Taguchi | G06Q 10/08 |
| | | | | 705/29 |
| 2016/0189081 | A1* | 6/2016 | Gajdzinski | G06Q 10/06393 |
| | | | | 705/7.39 |

* cited by examiner

200B

| SHARE SETTING FOR.... | | | |
|---|---|---|---|
| <BoM / Doc Name > | This BoM is Used Owned by < User Name> | | |

✉ USER NAME / EMAIL 1    [CAN EDIT ▼]    X
✉ USER NAME / EMAIL 2    [CAN READ ▼]    X
✉ USER NAME / EMAIL 3    [CAN EDIT ▼]    X

[EMAIL (S)]    [SELECT OPTION ▼]    [ADD]
　　　　　　　　CAN EDIT
　　　　　　　　CAN VIEW
　　　　　　　　CAN COMMENT (TBD)

⊙ SHARE WITH SUPPORT TEAM    [UPDATE]    [CLOSE]

HISTORY OF CHANGES....

> LATEST STATE (CURRENT DATE / TIME) ▼
OPERATION BB DONE BY USER NAME AT DATE/TIME
OPERATION QQ DONE BY USER NAME AT DATE//TIME
> REVISION 5 - (CURRENT NOTE) DATE/TIME
OPERATION Y DONE BY USER NAME AT DATE//TIME
OPERATION Z DONE BY USER NAME AT DATE//TIME ▼
OPERATION A DONE BY USER NAME AT DATE//TIME ▼
OPERATION B DONE BY USER NAME AT DATE//TIME ▼
(LOAD MORE – LOAD N CHANGES) ▼

| EXPAND |
| COMPARE COMING |

> REVISION 4 - (CURRENT NOTE) DATE/TIME
> REVISION 3 - (CURRENT NOTE) DATE/TIME
> REVISION 2 - (CURRENT NOTE) DATE/TIME
> REVISION 1 - (CURRENT NOTE) DATE/TIME

[ LOAD MORE... ] [ CLOSE ]

<Return to Dashboard
Part Number: /Not assigned Name: Multi-purpose Pump-Main-Boat Pump Assembly-1

| Latest State | Save new revision | History | ☐ Released | | | | | | | | User_1 ▶ |
|---|---|---|---|---|---|---|---|---|---|---|---|
| | | | | | | | | | | Set Inventories | Share |

| | Name | Images | Type | Quantity | Description | Part Number | Rev... | State | Material | Link to CAD | Page Count | Balloon Nu... | BOM View |
|---|---|---|---|---|---|---|---|---|---|---|---|---|---|
| 1 | Pump 1_2F-L95xg | | Part | 1 | Pump body | F-L95x-g | V | In_Progress | | Boat Pump PS | 1 | | Drawing, Engineering |
| 2 | Emb 1_2k | | Part | 1 | Impeller | Imp 1-2-KK | V | In_Progress | Stainless Steel 17-4 | Boat Pump PS | 1 | | Drawing, Engineering |
| 3 | Laving D85-55 | | Part | 1 | Gasket/Spacer | D-85-55X | V | In_Progress | Stainless Steel 17-4 | Boat Pump PS | 1 | | Drawing, Engineering |
| 4 | Cap D-85 | | Part | 1 | Pump Cap2 | D-85 | V | In_Progress | | Boat Pump PS | 1 | | Drawing, Engineering |
| 5 | Shaft 1_2 F-L95(L-104) | | Part | 1 | Shaft | L-104 | V | In_Progress | Stainless Steel 17-4 | Boat Pump PS | 1 | | Drawing, Engineering |
| 6 | Radial Ball Bearing__68_DIN (DIN 625 – 6203-1) | | Part | 1 | 33-14-8 | 6203-02-01T07:00:00.000Z | R1 | In_Progress | Stainless Steel 17-4 | Boat Pump PS | 1 | | Drawing, Engineering |
| 7 | Seal 33-14-8 | | Part | 1 | Seal | 33-14-8 | R1 | In_Progress | Silicon Rubber | Boat Pump PS | 1 | | Drawing, Engineering |
| 8 | Radial Ball Bearing__68_DIN (DIN 625 – 6203-2) | | Part | 1 | Radial Bearing | 6203-01-01T07:00:00.000Z | R1 | In_Progress | Stainless Steel 17-4 | Boat Pump PS | 1 | | Drawing, Engineering |
| 9 | Circlip 2 Large | | Part | 1 | Circlip 1.25 | HDWRE CC 1.25 | R1 | In_Progress | Aluminum - 2024 | Boat Pump PS | 1 | | Drawing, Engineering |
| 10 | Pan cross head_aj(CR-PHMS 0.164-36x0.75x0.75-N | | Part | 5 | Pan Head Screw | HDWRE PHS M6x12 | R1 | In_Progress | | Boat Pump PS | 1 | | Drawing, Engineering |
| 11 | Socket Head Cap Screw_DIN(DIN 912 M6 x 12 ... 12N) | | Part | 5 | Socket Head Screw M6x12 | HDWRE SHCS M6x12 | R1 | In_Progress | | Boat Pump PS | 1 | | Drawing, Engineering |

500 — Part Number: /Not assigned Name: Multi-purpose Pump-Main-Boat Pump Assembly-1

<Return to Dashboard

| Latest State | Save new revision | History | Redo | Where Used | ☐ Released | | Undo | | | | Set Inventories | User_1 ▶ | Share |

⊕ Item  ⊕ Property ○ Delete    ⤓ Export ▶  🛠 Tools ▶                    User_1 (The Engineer (BOM Owner))

| # | Name | Thumbnail Images | Type | Quantity | Description | Part Number | Composed of | Revision | State | Material | Link to CAD | Page Number | Balloon Nu... | BOM View |
|---|---|---|---|---|---|---|---|---|---|---|---|---|---|---|
| 1 | Pump 1_2F-L95xg | | Part | 1 | Pump body | F-L95x-g | | V | In_Progress | | Boat Pump PS | 1 | | Drawing, Engineering |
| 2 | Emb 1_2k | | Part | 1 | Impeller | Imp 1-2-KK | | V | In_Progress | Stainless Steel 17-4 | Boat Pump PS | 1 | | Drawing, Engineering |
| 3 | Laying D85-55 | | Part | 1 | Gasket/Spacer | D-85-55X | | V | In_Progress | Stainless Steel 17-4 | Boat Pump PS | 1 | | Drawing, Engineering |
| 4 | Cap D-85 | | Part | 1 | Pump Cap2 | D-85 | | V | In_Progress | Stainless Steel 17-4 | Boat Pump PS | 1 | | Search / Select All / Drawing / Engineering  OK |
| 5 | Shaft 1_2 F-L95(L-104) | | Part | 1 | Shaft | L-104 | | V | In_Progress | Stainless Steel 17-4 | Boat Pump PS | 1 | | Drawing, Engineering |
| 6 | Radial Ball Bearing_68_DIN (DIN 625 -- 6203-1) | | Part | 1 | 33-14-8 | 6203-02-01T07:00:00.0002 | | R1 | In_Progress | Silicon Rubber | Boat Pump PS | 1 | | Drawing, Engineering |
| 7 | Seal 33-14-8 | | Part | 1 | Seal | 33-14-8 | | R1 | In_Progress | Stainless Steel 17-4 | Boat Pump PS | 1 | | Drawing, Engineering |
| 8 | Radial Ball Bearing_68_DIN (DIN 625 -- 6203-2) | | Part | 1 | Radial Bearing | 6203-01-01T07:00:00.0002 | | R1 | In_Progress | Aluminum-2024 | Boat Pump PS | 1 | | Drawing, Engineering |
| 9 | Circlip 2 Large | | Part | 1 | Circlip 1.25 | HDWRE CC 1.25 | | R1 | In_Progress | | Boat Pump PS | 1 | | Drawing, Engineering |
| 10 | Pan cross head_aj(CR-PHMS 0.164-36x0.75x0.75-N | | Part | 5 | Pan Head Screw | HDWRE PHS M6x12 | | R1 | In_Progress | | Boat Pump PS | 1 | | Drawing, Engineering |
| 11 | Socket Head Cap Screw_DIN(DIN 912 M6 x 12 ... 12N) | | Part | 5 | Socket Head Screw M6x12 | HDWRE SHCS M6x12 | | R1 | In_Progress | | Boat Pump PS | 1 | | Drawing, Engineering |

Engineering view

| Part Number | Description | QTY | PDF file | Cost | Lead Time | Supplier | CAD file |
|---|---|---|---|---|---|---|---|
| 00-100 | Base deck | 1 | Base.sldprt | 17.34 | 1 week | ABC | Link |
| 00-300 | Truck | 1 | TruckAssy.sldasm | 8.22 | 2 weeks | ABC | Link |
| 00-400 | Nut | 6 | | 0.11 | | | Link |
| 00-500 | Screw | 6 | | 0.22 | | | Link |
| 00-200 | Heavy duty wheel | 4 | Wheel.sldprt | 4.33 | 1 week | W939 | Link |

Supplier view

| Part Number | Description | QTY | PDF file | Cost | Lead Time |
|---|---|---|---|---|---|
| 00-100 | Base deck | 1 | Base.sldprt | 17.34 | 1 week |
| 00-300 | Truck | 1 | TruckAssy.sldasm | 8.22 | 2 weeks |

MULTI-MEMBER COLLABORATION AND DATA MANAGEMENT SYSTEM AND METHOD

PRIORITY CLAIM

This application claims the benefit of priority to U.S. Provisional Patent Application No. 62/579,653 which was filed Oct. 31, 2017, and is a continuation-in-part of co-pending U.S. patent application Ser. No. 15/460,803, which was filed on Mar. 16, 2017, the contents of each are hereby incorporated by reference in their entirety.

FIELD OF THE INVENTION

The present disclosure relates to a collaborative data editing, and in particular project and associated task management, bill of materials (BOM) management, or other collaborative data, information, and task tracking which may require input from various users and approval from various users for viewing, changing, or altering fields or tasks therein.

BACKGROUND

The following description includes information that may be useful in understanding the present invention. It is not an admission that any of the information provided herein is prior art or relevant to the presently claimed invention, or that any publication specifically or implicitly referenced is prior art.

As one example, in the course of manufacturing products, information about each component or sub-product in the way of a Bill of Materials (BOMs) is often provided and tracked by a project manager. The term "Bill of Material" or "BOM", as generally understood in the art and as used herein, refers to a detailed parts listing which can be organized into sub-lists and/or subassemblies. Specifically, a product may have many subassemblies, some or all of which may have further subassemblies. This information can often be input or created by multiple actors or users (e.g. designers, engineers, manufacturing planners, supply chain and sourcing managers and others). Bills of Materials are used extensively in the manufacturing process to assist with material requirements, and to detail the exact parts, formula, or recipe for a particular finished product. In order to speed up the pace at which consumer demands for a new or modified product are satisfied, manufacturers will typically utilize a Bill of Material system. A Bill of Material may be a printed-out parts list having indentations where the indentations correspond to a depth of hierarchy for each product utilizing each subassembly. The Bill of Material traditionally has been utilized during the manufacturing process of an assembly to provide a reference for the relationship of each component to other components in the assembly. Once the Bill of Material is created, it can be used by a manufacturer in order to provide a benchmark to which production is compared for exact manufacturing instructions, particularly where component quantities and mixtures are critical. In either case, accuracy of the Bill of Material is critical for material requirements planning (MRP) and accurately projecting costs. Some systems extend the Bill of Materials by adding specific manufacturing details, scrap percentages and packaging/labeling methods. Most provide the ability to add routings to the Bill of Materials. Routings are often referred to as work centers or equipment areas. These routings are used to assist with scheduling the manufacturing processes, adding labor and equipment costs, and even adding start-up and overheads to the Bill of Materials. Thus, the Bill of Materials is an important part of many manufacturing processes.

Some systems have been developed to build a collaborative BOM version tracking system where multiple users can update, add, view, edit or control specified sections of a given BOM. For example, the system described in patent application Ser. No. 15/460,803 filed Mar. 16, 2017 which is incorporated herein in its entirety.

In a collaborative system, such as mentioned above, permissions and approval for various processes, purchasing, decisions, engineering and any other task that necessitates signing off as versions change is often required. In other words, the skilled workers or implementers require certain tasks to be approved by a manager or other overseeing authority. As a result, often times systems require a user to submit a proposal, draft or other to be reviewed (signed off on) request. This back and forth of requests often requires large amounts of time and chasing of individuals, who are often busy and, as such, these approvals can be difficult to obtain.

The present application attempts to provide a system and method to streamline those approval processes in order to expedite the speed at which projects are executed wherein the system can be utilized so as to provide a forum in which collaborative team processes can be viewed and tracked, and where data from various teams can be provided via pre-defined role-based views allowing multiple users to submit data simultaneously so as to support or otherwise facilitate decision making in collaborative process.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY

The present disclosure relates to A Multi-Member Collaboration and data Management System and Method. More particularly, the present disclosure relates to creation, entry, editing, and version control of an overarching project and a plurality of tasks associated therewith which may have one or more users or groups having customized subsets of tasks, information, etc. can then filter information, tasks, etc., which may be pertinent to a particular team or individuals portion of the required tasks etc. which can be viewed by the associated group or individual on a common platform based on rights of said one or more users on one or more sections/fields of the project.

In one aspect, the project and associated tasks can be editable by one or more users; wherein a first user, based on rights assigned to the first user, can be allowed to edit the various tasks or information associated with the project. As such, the project can be provided have a profile ID which can include various project details or information regarding the project as contained in a plurality of structured fields, each of the plurality of structured fields having at least one defined property; a user rights based project details edit update module, which when executed by the one or more processors, updates at least a second user of the editing done by the first user based on rights assigned to the second user, wherein the rights of the second user are at least for the sections or fields edited by the first user; and a user update based details version management module, which when executed by the one or more processors, saves a version of the project detail, and associated fields, based on the editing done by the first user.

In some embodiments, rights can be assigned to enable each user to either edit or only view each of the structured fields within the project details. In another aspect, the rights can be assigned for each structured field with regard to editing or viewing the information contained in each of the one or more structured fields of the project.

In another aspect of the present invention, the multi-member collaboration and data management system and method can further include a user update based data relationship maintenance module, which when executed by one or more processors, can be performed automatically, based the editing done by the first user, then automatically assess any impact of the editing and subsequently maintain a data relationship across one or more sections and/or fields of the project based on the assessed impact. Being collaborative, the proposed system can also allow any number of additional users to edit the BOM simultaneous along with the first user, each user having a particular set of permissions, which can be individually assigned, or assigned in accordance with a user group to which the user belongs.

In an additional aspect, the system of the present disclosure can further include a structured data-based field creation module, which when executed by the one or more processors, enables at least one administrator to create the plurality of structured fields having corresponding properties for each field.

In another aspect, the system of the present disclosure can further include a user rights association module, which when executed by the one or more processors, enables an administrator to assign rights to one or more users for editing or viewing of one or more structured fields associated with the project, and either allow or disallow editing or viewing of at least one structured field of the project.

In yet another embodiment a multi-member collaboration and data management system can comprises at least one remote database; at least one remote processing server, having at least one processor and at least one non-transitory computer-readable medium containing at least one executable set of computer instructions capable of generating a plurality of user profiles; wherein the at least one remote database and the at least one remote processing server are connected via a network. A plurality of user interface ports, which are each accessible by at least one of the plurality of user profiles, are able to communicate with the at least one remote processing server via the network. This enables a user-managed bill of materials having a plurality of fields to be generated by the at least one remote processing server based on input from a first user profile and a set of structural rules. The set of structural rules can be contained at least partially on the at least one non-transitory computer-readable medium of the at least one remote processing server. Each of the fields of the user-managed bill of materials has a user-selected property associated therewith, wherein the properties associated with each field in-part determine a location on the remote database for storing information associated with each field. By having pointers to the remote database as a result of the field properties, information associated with a given field can be both permanently stored in a database, or at least semi-permanently stored in a database while the user-managed bill of materials can be edited in real-time by multiple user profiles simultaneously.

In yet another aspect, the system of the present disclosure can further include a user activity history management module, which when executed by the one or more processors, manages user-level history of actions performed on each structured field for each edit made by each user of the project and associated structured field.

The present disclosure also relates to a method comprising the steps of enabling a first user to, at a first computing device, based on rights assigned to the first user, edit the project, wherein the project comprises a plurality of structured fields, each of the plurality of structured fields having at least one defined property; updating at least a second user of the editing done by the first user based on rights assigned to the second user, wherein the rights of the second user are at least for one or more structured fields edited by the first user; and making a version of the project details based on the editing done by the first user.

In some aspects, rights can be assigned to a department or to an entity of which the first user forms part.

In some additional aspects, the plurality of structured fields can be selected from any of, or a combination of, part name, part usage, part quantity, part price, part image, part type, part description, part number, part unique identifier, revision, state, material, product that the part forms part of, manufacturer information, supplier parameters, and part attributes.

In yet another embodiment a first user can selectively grant permissions to a second user to edit, view, or share a portion of the plurality of structured fields associated with the first user. In turn, the second user can create new structured fields and selectively grant permissions to the first or a third user to edit, view or share a portion of the plurality of structured fields associated and either controlled or created by the second user, wherein the third user can do the same with a third plurality of structured fields associated with the third user. Thus, the first, second and third users can each view, edit or share a portion of the plurality of structured fields associated with each user.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

FIGS. 2A-C illustrate various exemplary screenshots being illustrative of exemplary aspects of how a project and associated structured fields can be structured in accordance with an embodiment of the multi-member collaboration and data management system and method of the present disclosure;

FIGS. 5A-F illustrate exemplary representations show how a project and associated structured fields can be created, edited, updated, and managed in accordance with an embodiment of the present disclosure;

DETAILED DESCRIPTION OF DRAWINGS

The present disclosure relates to a multi-member collaboration and data management system and method. More particularly, the present disclosure relates to creation, entry, editing, and version control of structured fields associated with a project by one or more users at a common platform based on rights of said one or more users.

In some instances of the previously existing methods of approving a given project or task. The task or project can be prepared by a member of the team, when they feel it is ready for approval, it is submitted to another member of the team that signs off on the task. In some companies or organizations, multiple members often get involved to sign off on a given project. For example, a design presents a concept that needs approval from engineering, but also manufacturing, as well the finance department from a cost perspective, and even sales or marketing member. Each of these members often has a unique skill set, which is why they work together as a team when moving any given project or task forward. If the task has to go through the cycle with each specified manager then one can easily see how this iterative process can take a lot of time. In some cases, the updates and number of presentations may be multiplied, because a change for one manager might conflict with a request of another manager.

Figure 8:
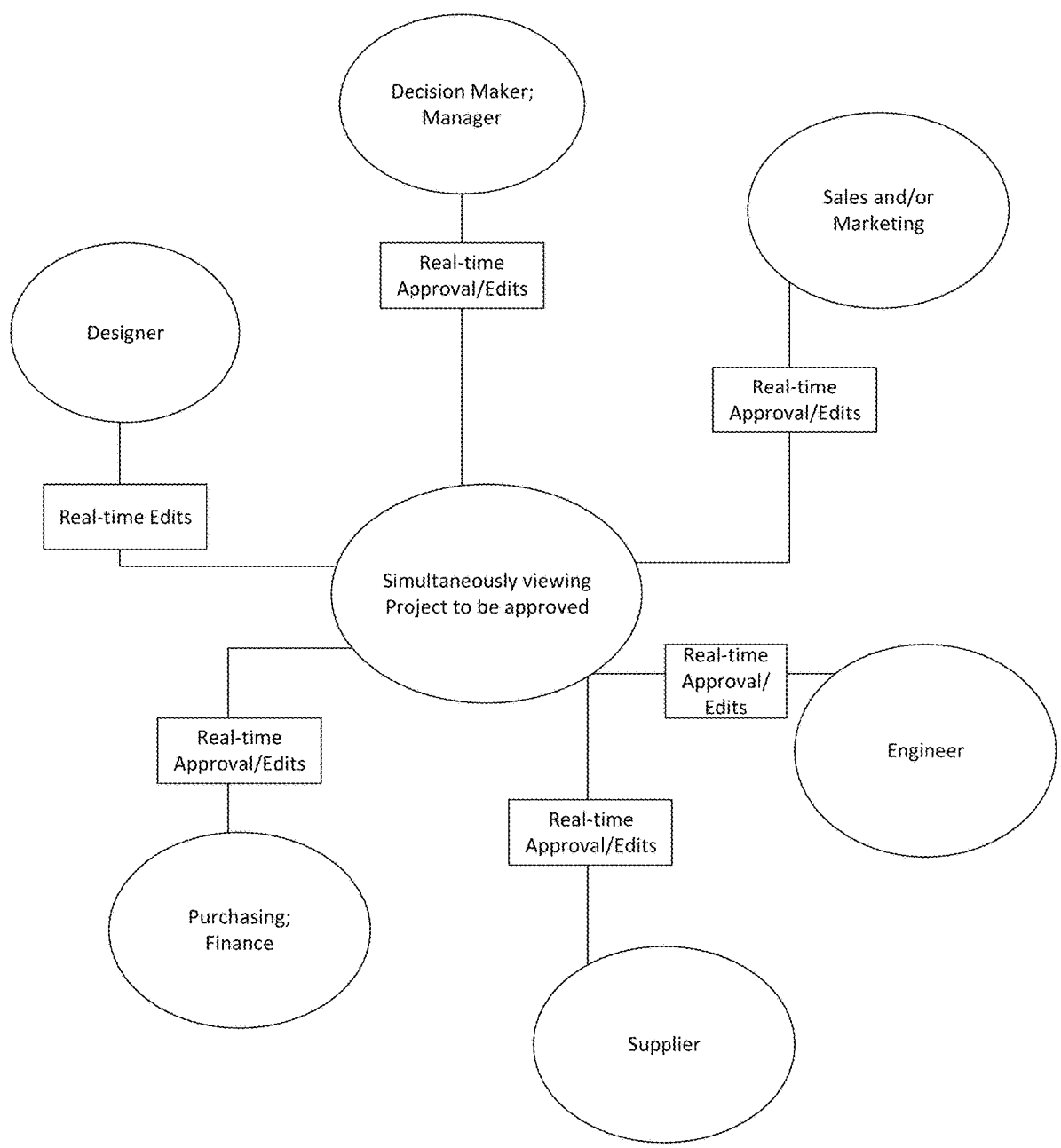
FIG. 8 illustrates a flowchart or schematic of various steps and structures for use with the multi-member management decision making system and methods as disclosed herein.

In attempt to streamline the approval process, a common interface can be presented to allow for multiple members or collaborators involved in a decision-making process, such as the flowchart illustrated in FIG. 8 demonstrate. Through a commonly displayed interface or portal, multiple members or collaborators can simultaneously view the project and associated tasks, in this collaborative setting approvals or other changes can then be instantly made as well as instant and viewed by the plurality of users in concert. For example, a member of the finance group can weigh in on the process and as soon as the financial numbers meet their expectations an approval can be made. This approval can come in the form of a checkbox or other indication means. The financial member of the team can leave the collaboration as soon as his/her portion is satisfied. Alternatively, the financial group member can view multiple projects simultaneously and likewise accept or signoff on multiple projects at once, while being in collaboration with members across multiple projects. If edits or requests for changes need to be made they can be made in real-time with other members of the team. Those changes may not necessarily require another member to implement and can be edited or modified directly by the specified manager. For example, sales require additional quantities and can see the supplier and manufacturing has the capacity to increase volume. Instead of discussing with the supplier and then with manufacturing individually sales can sign off and have the action proceed.

In an aspect, the present disclosure relates to a multi-member collaboration and data management system and method, as illustrated in FIGS. 1-14, wherein the said system can include: a non-transitory storage device having embodied therein one or more routines operable to create and manage the multi-member collaboration and data management system 100 that is editable by one or more users; and one or more processors coupled to the non-transitory storage device and operable to execute the one or more routines. In an aspect, the one or more routines can include a user rights based project editing module, which when executed by the one or more processors, enables a first user to, based on rights assigned to the first user, edit the one or more structured fields associated with a particular project, each of the plurality of structured fields having at least one defined property; a user rights based project edit update module, which when executed by the one or more processors, updates at least a second user of the editing done by the first user based on rights assigned to the second user, wherein the rights of the second user are at least for the sections or fields edited by the first user; and a user update based project version management module, which when executed by the one or more processors, saves a version of the project based on the editing done by the first user.

In some embodiments, rights can be assigned to enable the user to either edit or only view each of the structured fields associated with the project. In another aspect, the rights can be assigned for editing or viewing of one or more structured fields or categories of fields associated with the project, or for editing or viewing of at least one structured field of the project.

In yet additional embodiments, the system of the present disclosure can further include a user update-based data relationship maintenance module, which when executed by the one or more processors, automatically, based the editing done by the first user, assesses impact of the editing and maintains data relationship across one or more sections and/or fields of the project based on the assessed impact.

Being collaborative, the proposed system also allows a third user to edit a permitted structured field simultaneously with the first user.

In various additional embodiments, the system of the present disclosure can further include a project structured data-based field creation module, which when executed by the one or more processors, enables at least one administrator to create the plurality of structured fields having corresponding properties for each field.

In another aspect, the system of the present disclosure can further include a user rights association module, which, when executed by the one or more processors, enables an administrator to assign rights to one or more users for editing or viewing of one or more sections of the project, or for editing or viewing of at least one field of the project.

In yet another aspect, the system of the present disclosure can further include a user activity history management module, which when executed by the one or more processors, manages user-level history of actions performed on any one of the structured fields associated with the project by each user's actions within the structured fields of the project.

The present disclosure further relates to a method comprising the steps of enabling a first user to, at a first computing device, based on rights assigned to the first user, edit one or more structured fields of the project, wherein the project comprises a plurality of structured fields, each of the plurality of structured fields having at least one defined property; updating at least a second user of the editing done by the first user based on rights assigned to the second user, wherein the rights of the second user are at least for the sections or fields edited by the first user; and making a version of the project and associated tasks or structured fields based on the editing done by the first user.

In yet additional embodiments, rights can be assigned to a department or to an entity of which the first user forms part.

In another aspect, the plurality of structured fields can be selected from any or a combination of part name, part usage, part quantity, part price, part image, part type, part description, part number, part unique identifier, revision, state, material, product into which the part belongs, manufacturer information, supplier parameters, and part attributes.

In implementation, one example can include a project which involves a bills of materials (BOMs). It will be understood that a BOM is typically used to identify various parts, components and processes which are necessary to manufacture a particular product. They are useful for organizing, coordinating and tracking various steps to manufacture or otherwise create a product. BOMs are generally created by a BOM originator, such as an original equipment manufacturer (OEM). The OEM uses the BOM to coordinate with one or more suppliers, machinists, service providers, to obtain quotes for costs, quantities, delivery or lead times, and so forth. The suppliers can provide such information back to the OEM or the BOM of the OEM. This information is then collected, analyzed, and used to aide in generating purchase orders, transaction documents, and other kinds of information. This process may be referred to as "sourcing" a BOM, which can include multiple sourcing agents.

By way of example, an automobile or airplane is a product that requires thousands of parts and processes in order to be completed. A sourcing agent for a car, may be focused solely on a particular area of the car such as the transmission, engine cooling system, or computer system. Each of these various systems may have linking, complementary or shared components, and therefore it is important to understand effects each has and what affect changing or modifying a component can create. For instance, if a transmission sourcing agent is unable to obtain a particular component that interacts with the engine's cooling system a new equivalent or similar component might have to be obtained. This could require the adapting component of the engine cooling system to also need modification. Options could include: 1) sourcing a new engine cooling system component, 2) create a new component or solution by engineering, or 3) identify a bridging or coupling component. Each of these scenarios requires another user or group to engage in the process. In many instances, working on parallel solutions is the path forward. One can imagine that as multiple sourcing agents are looking to procure components, competitive pricing or financial restrictions, and do so in an efficient manner, these processes again are done in parallel when possible and not sequentially unless necessary. As such, the present application seeks to provide solutions that enable parallel processing or data viewing to occur in the multi-member collaboration and data management system 100 (hereinafter also simply referred to as "system 100" hereinafter).

In an aspect, the present disclosure relates to the multi-member collaboration and data management system 100 can include at least one remote database; at least one remote processing server having at least one processor and at least one non-transitory computer-readable medium containing at least one executable set of computer instructions capable of generating a plurality of user profiles, wherein the at least one remote database and the at least one remote processing server are connected via a network. The system can further include a plurality of user interface ports, each accessible by at least one of the plurality of user profiles, and wherein the interface ports communicate with the at least one remote processing server via the network. The system of the present disclosure can further include a user-managed project having a plurality of structured fields, the user-managed project being generated by the at least one remote processing server based on input from a first user profile and a set of structural rules contained at least partially on the at least one non-transitory computer-readable medium of the at least one remote processing server, wherein each of the structured fields of the user-managed project has a user-selected property associated therewith, and wherein the properties associated with each structured field in part determine a location on the at least one remote database for storing information associated with each structured field, and further wherein the information associated with each structured field of the user-managed project is configured to be edited by multiple user profiles simultaneously.

In an aspect, the proposed project can further include various highlighted fields which are indicative of a particular user profile that is either viewing or editing a particular highlighted field, wherein each user profile has a different highlighting color associated therewith.

In another aspect, the first user profile can be configured to grant read/write permissions to an additional user profile for selected fields. In another aspect, the read/write permissions can include additive permissions that allow the additional user profile to generate additional fields in the project. In another aspect, the additional user profile permissions include controlling read/write permissions associated with any additional fields generated by the additional user profile. In an aspect, a user profile having read/write permissions saves an immutable revision of the user-managed bill of materials, whereas user profile having read permissions views a history of changes between revisions.

In an aspect, one or more properties or information associated with the fields of the project having a given revision are unalterable. In another aspect, one of the fields contains information associated with a second project, wherein the immutable revision preserves the information associated with the second project at a moment of saving. In another aspect, one of the fields can include information associated with a second project, wherein the immutable revision preserves the information associated with the second user-managed BOM at a moment of saving. In yet another aspect, one of the fields can include information associated with a revision-controlled item, wherein the immutable revision preserves the information associated with the revision-controlled item at a moment of saving. In yet another aspect, one of the fields can include information associated with a revision-controlled item, wherein the immutable revision allows the information associated with the revision-controlled item to be saved according to a user-profile-selected revision of the revision-controlled item.

Figure 1:
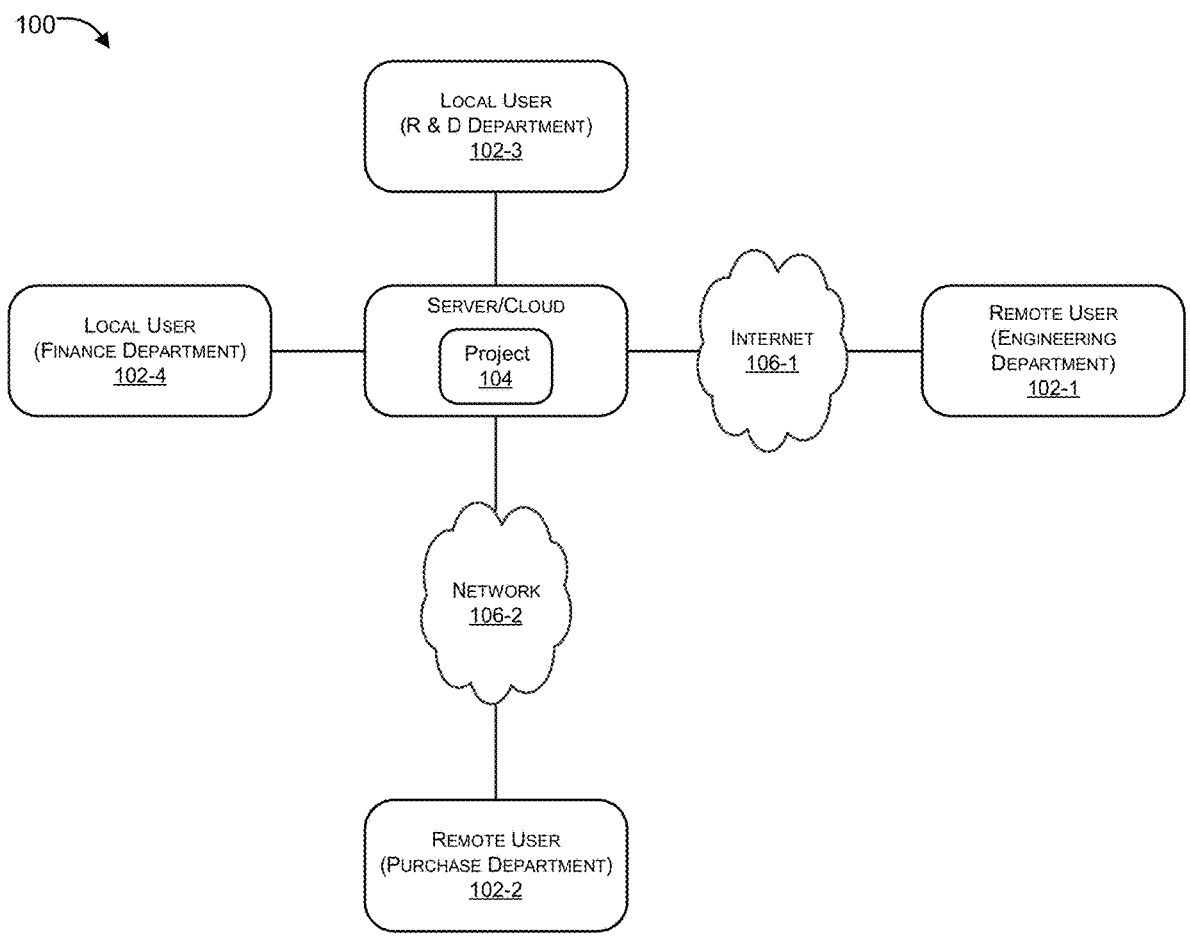
FIG. 1 illustrates an exemplary network architecture of creation and management of a project and associated structured fields in which aspects of the multi-member collaboration and data management system and method of the present disclosure can be implemented.

FIG. 1 illustrates an exemplary network architecture for creation and management of a project in which aspects of the present disclosure can be implemented. As can be seen, architecture of the proposed system can be implemented across one or more networks which are spaced across geographies and enable remote/local users from one or more organizations/departments to access project 104 that can be hosted on a server or cloud. As shown, networks 106-1 and 106-2 can be configured such that one or more remote users such as 102-1 (from Engineering Department) and 102-2 (from Purchase Department) can respectively be operatively coupled and allowed to access the project 104. Similarly, local users 102-3 (from R&D department) and 102-4 (from finance department) can also be configured to locally access the project 104.

As would be appreciated, each user (local or remote) 102 can be assigned certain rights to access the project 104, wherein such rights can either be only to view the project 104 or to edit the one or more structured fields 106 within the project t104. Rights can also be assigned either to the complete project 104 or to specific/defined sections/fields thereof, wherein each field of the proposed project is structured with defined properties. For instance, "type" field of the project 104 can be configured to accept specific values and allow only certain types of operations/actions to users 102 editing the structured fields 106 within the project 104.

In yet another aspect, the proposed system can be designed to prepare projects for any field of business, and can be configured with structured fields that have predefined properties so as to prepare recurring projects more efficiently and quickly. Also, the proposed system, which can be configured in the form of a downloadable application, for instance, enables user to save revisions of the project in the form of historical immutable snapshots. The proposed system further supports third party software such as CAD, wherein users can be restricted to edit/view certain parts of the project depending on their role/attributes. Also, the proposed system enables multi-level projects to be created because of the structured nature of fields.

In another aspect, the proposed disclosure/system can be configured such that multiple users, each having differentiated roles need not view all fields of a project. For example, fields relevant to a manufacturer may not be necessary for an engineer for the same project. It may also be configured that certain fields/section of the project are viewable to a user but locked for editing based on rights associated with the user.

In an aspect, changes made by a user A to the proposed project can be intimated to all users whose rights allow them to be notified when fields/sections that the user A edited are updated. It may also be possible that editing done by user A on a project is only effected/updated when user B, when intimated about the proposed editing, confirms the edits. Furthermore, in another implementation, an administrator may be intimated whenever a user, who does not have an access to a field/section, attempts to edit the field/section, even though such action would be unsuccessful and the user would not be allowed to edit. In yet another exemplary embodiment, the proposed system allows for change reporting, wherein at any moment of time, a user can create a report (for instance in .xls or any other spreadsheet format) regarding what changes occurred between two specific project revisions. Such revision editing can be performed dynamically and/or at manually selected events, and therefore the proposed system enables creation of revisions (immutable snapshots) by a user, in addition to keeping track of edits automatically. Users can also create a revision at any time; they are an immutable snapshot of a project at a specific moment of time.

As discussed above, the proposed system can have pre-defined field structure, meaning that each field in the proposed system can have one or more predefined properties, based on its type. Such structured fields enable better management of projects and add features such as multi-level projects. The pre-defined property types can include properties such as: Number, Text, List, Reference, Draftsman, Owner, Cost, Purchase Order, Client, Vendor, Project, Sales Lead, Engineer, Designer, Revision, Status, Material, File Type, CAD, Quantity, Thumbnail Image, or any number of properties which enables efficient management/scaling of projects and is focused on a specific field of related projects. These pre-defined properties enable the system to create pointers and direct where in the database(s) to store the information associated with each of the pre-defined fields. It also assists in retrieving information quickly. Any entered or uploaded information can also be scrubbed on the user interface end to reduce the load or amount of information and coupled with a Web Service API to quickly move information between users.

Properties for different fields can also be defined based on the entity/user that would/should be allowed to edit that field, possible values that the field can take, kind of edits that the field can undergo, impact that each field edit should/would have on other fields, among other like property definitions. For instance, one property for field "part quantity" can be that when the quantity is less than a defined threshold, vendor of the part be automatically notified, wherein such a property can be defined in a template such that each project administrator can configure/customize the template accordingly. For instance, the template can be "when part quantity of <<part>> is less than <<n>>, email <<vendor>> at <<vendor email address>>", which gives the flexibility to the administrator to define the values of part, n, vendor, and vendor email address for multiple parts that form part of a project, and for multiple projects that either work independently or work in a multi-project architecture.

As would be appreciated, one or more the fields (including properties thereof) and values thereof can be stored in a database that can be local or remote to the users editing a particular project.

The predefined properties in one sense act as filters and/or links and enable the fields to analyze the information entered therein. For example, "D-85" entered into a field without a field property is nothing more than text in a field. However, if the property of the field is defined as "Part Number" the field can now use "D-85" to locate information associated with that field from a database where part numbers are stored. Additionally, an adjacent field may have "V" entered therein. Again, without a defined property associated with the field, "V" has no value other than entered text. If the field is now defined as a "Revision" field, it can associate revision with either a project, part number, or other field to create a more intelligent system. Continuing with this example, if a part number, "D-85" has been placed in the field next to revision field "V" the revision field can look to the part number and confirm in a database that "D-85" has a revision V associated therewith. If not, it can add a new revision number to the part number, confirm the revision level is correct, ask if this is revision corresponds with the adjacent part number or if blank populate a revision number based on the part number entry adjacent the "Revision" field.

Information associated with the fields can be user entered, drawn out of a remote database, or uploaded by a user. For example, the engineering team design creates a new Skateboard assembly 300B (refer to FIG. 3B) having various components: front axle 302, with left and right front wheels 310a-b, rear axle 304, with left and right rear wheels 312a-b, board 306, and brakes 308. If this is a new skateboard assembly, the engineering team can upload the CAD files associated with each part as well as the overall assembled 300B system into the remote database. As revisions to the board, axles or wheels are made those models can be further uploaded and associated with the original versions. Alternatively, components such as the axles and wheels might be standard parts that have been incorporated into the new skateboard assembly 300B. These parts might already be in the database and by entering their part number can now be associated with or linked to the Skateboard assembly 300B BOM.

It should be noted that when files are uploaded or information is entered, the system in one embodiment extracts the relevant information and data from the file or entered parameters. The system can utilize a Web Service API to extract the relevant information, which in part helps enable faster transfers of information.

Figure 3A:
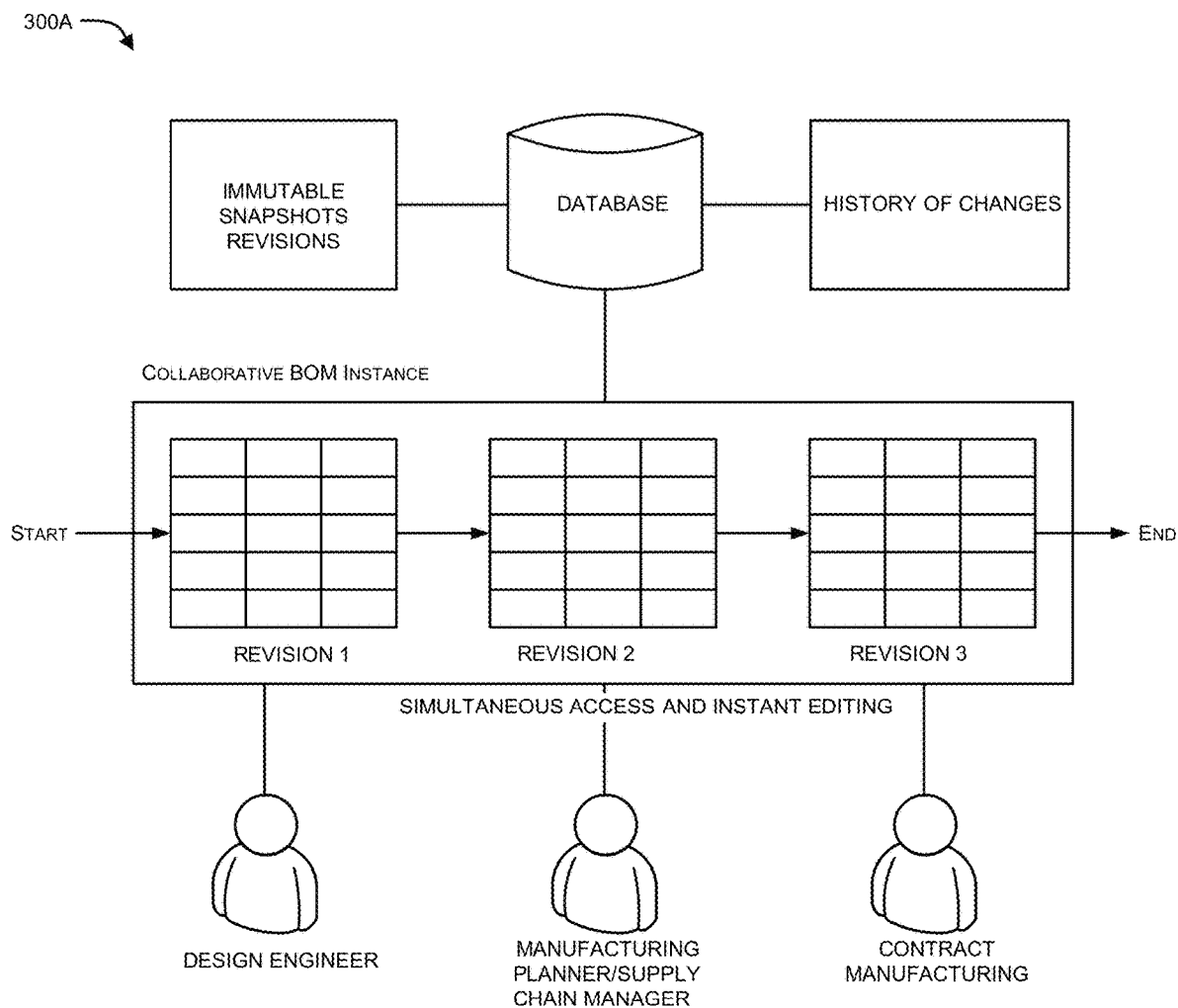
FIGS. 3A-D illustrate various exemplary screenshots illustrating an exemplary project and associated structured fields management and version/revision control in accordance with an embodiment of the present disclosure.
Figure 3B:
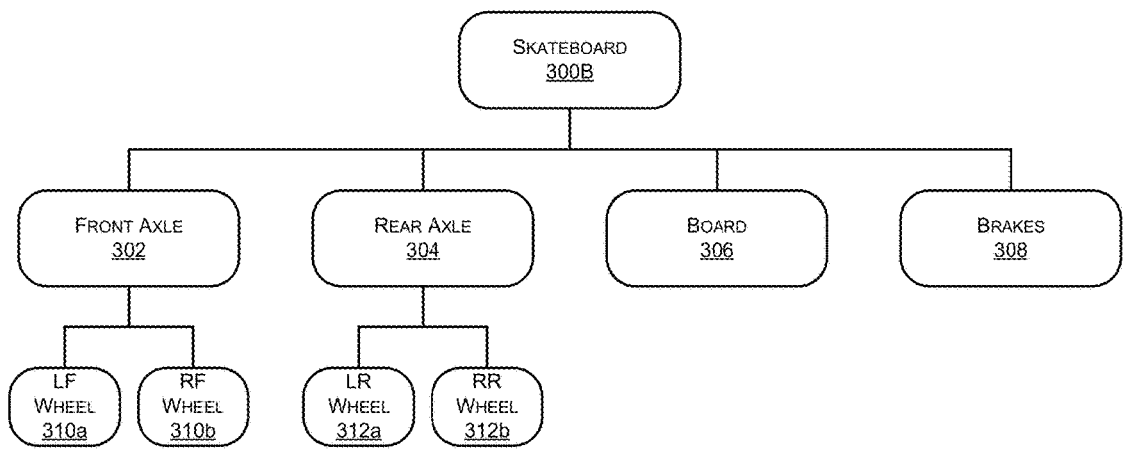
Figure 3C:
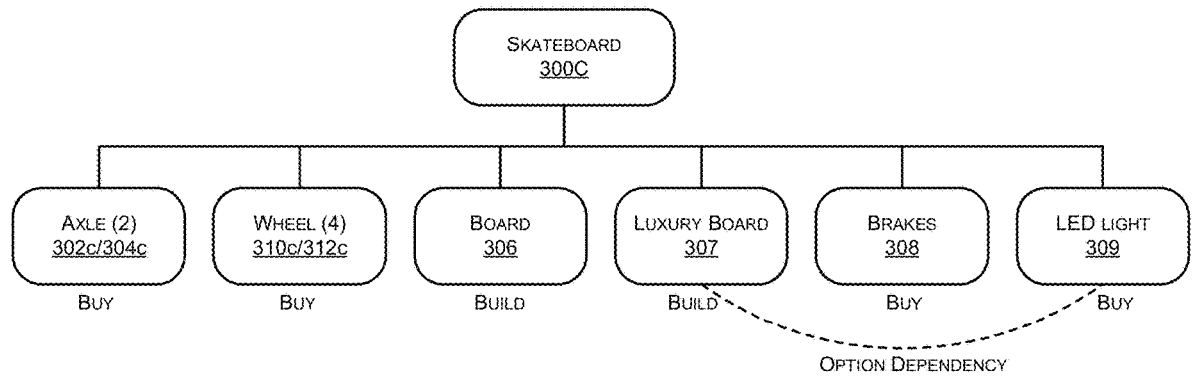

The design team can be working in real-time with the engineering team, as well as the purchasing team to update skateboard assembly 300B to 300C (refer to FIG. 3C). The design team might recognize that the front and rear axles are interchangeable as well as the wheels, or that an equivalent axle 302c/304c can be purchased from a vendor. Similarly, they might recognize that certain wheels are more popular and swap out 310a-b and 312a-b for popular or easily obtainable wheels 310c/312c. The purchasing agent can also in real-time look to source certain components and place quantities based on estimates from a sales team. The design team might also add a luxury board 307 with an LED light 309 as "optional package" or premium offering skateboard assembly 300C. The engineering team can now pull this luxury board into their models as an option or modify it to fit the current system. Those modifications can then be source to manufacturing, who has purchasing send LED lights 309 to them for integrating into the luxury board. As a result of the structural system, and in particular the properties associated with each field, the remote database can appropriately store each of these updates. Once a "released BOM" is created an immutable snapshot of everything in the given revision is permanently saved. Thus, skateboard assembly 300B can be saved as one immutable snapshot and skateboard assembly 300C can be saved as another. If the individual parts, quantities, vendors and so forth are updated a new immutable snapshot or BOM revision can be saved such as 300D (refer to FIG. 3D) which includes front and rear components 330 and 340 along with a paint scheme 320. These immutable snapshots are determined by the user. A history of changes between each snapshot can be determined as well. The history of changes can even track multiple changes to a given field. For example, if the wheel diameter was specified at 4 inches by one user, then another user specified 6 inches or changed the field to 6 inches, and then a third user updates it to 5 inches, the database saves each of those entries. However, if it gets changed back to 6 inches and an immutable snapshot is taken or saved, that revision will forever have the wheel diameter as 6 inches. By saving immutable snapshots, updates can be made to each of the parts, quantities, vendors and so forth in real-time without changing or effecting a prior project revision, illustrated here as a BOM. This is managed through the database, which stores the information based on the properties associated with each field.

As mentioned above, the proposed system allows Multi-level bill of materials wherein, for instance, each level can be for one part of a vehicle (say tire, steering, brakes) where each part can include multiple components, details of which would come in respective part level. As also mentioned above, the proposed system enables integration with CAD with an ability of BOM being imported from/into all major CAD systems such as SolidWorks, SolidEdge, Altium Autodesk Inventor, and Autodesk Fusion360.

Figure 2A:
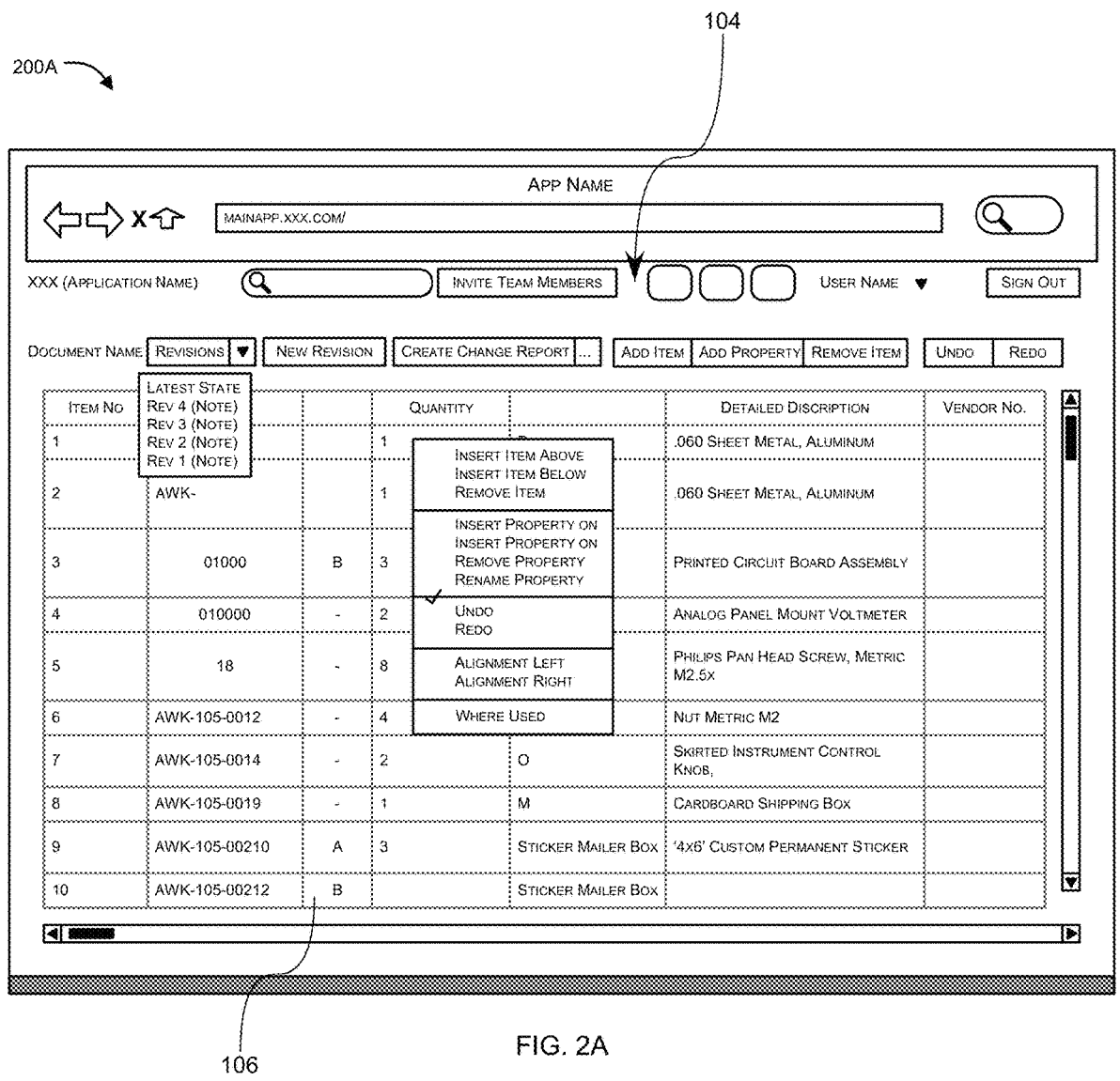

In an aspect, the system 100 of the present disclosure can be implemented as a web application, or a mobile application, or in any other form factor that allows aspects of the present invention to be protected. in some such embodiments the project can be represented as a graph or matrix data structure, the data structure containing elements of data in the product—assemblies, sub-assemblies, components and information about them. Depending on the type of product and manufacturing process, the project can also include a variety of constraints. A simple example of constraints is a specific configuration of a product (options), plant constraints (product manufactured in different plants), date constraints (availability of a specific component for a period of time) and cost constraints, i.e. component costs, MOQ—minimum order quantity, which depends on number of units you want to build, etc. Information about these constraints as well as a project data structure (graph) can typically be stored in a database (or multiple databases) depending on a company and software used to manage the project. FIG. 2A illustrates an exemplary representation of a project interface 200A which illustrates how the multi-member collaboration and data management system 100 can be structured for design purposes. FIG. 2B illustrates an exemplary representation of an invitation or administrative interface 200B of how the multi-member collaboration and data management system 100 can be structured for adding users and assigning permissions for a given project. FIG. 2C illustrates an exemplary representation of a Change of History interface 200C on an exemplary portal, illustrative of how the multi-member collaboration and data management system 100 can be structured for displaying the various changes to a particular project were made and between saved revisions or immutable snapshots. In some instances, the values can also be assembly operation sequences.

In an exemplary aspect, the proposed technique/system relies on the demand of users—engineers, manufacturing planners, supply chain managers and others to access and edit the project's structured fields in a way of table (or spreadsheet) that represents information that can be accessed and edited. In addition, the proposed method allows multiple users to access and change data simultaneously at the time while maintaining consistency of data and operations between changes made by multiple users. In an aspect, the proposed system processes data with regard to the project can be arranged as a table with properties representing various characteristics of information and lines representing items (assemblies, subassemblies and parts). In a further aspect, the proposed technique/system/method allows multiple users to edit the project and associated structured field simultaneously and maintain consistency of data and operations.

In an aspect, the proposed system allows for multiple users to simultaneously work in a particular structured field of the project. Using the example above, as part of the engineering team is vetting the viability of a potential new replacement component that a sourcing agent is acquiring information on, another part of the engineering team could be developing a new revision. Each user or group can update the particular project as information becomes available. Other projects that incorporate this component which would be replaced by the new component can also be updated and the changes be proliferated through all related projects as contained in the multi-member collaboration and data management system, which ability to simultaneously work and edit a particular project can be enabled by capturing the change history of each user, maintaining or keeping relationships of components through the editing process, and taking 'immutable snapshots' along the way.

By capturing the change history of each user, a clear picture of the processes used to bring about the designated changes can be recorded and analyzed (see FIG. 3A as an example), which allows for retracing of steps and altering processes with other users to ensure that correct solutions are reached. 300A is another exemplary embodiment of structural overview of the multi-member collaboration and data management system where multiple users interact with a particular project through the various revision cycles. Users can access the system through a portal such as a web browser where each user can be given a unique identifier or profile which can then be traceable as they interact with the system through said portal.

Figure 3D:
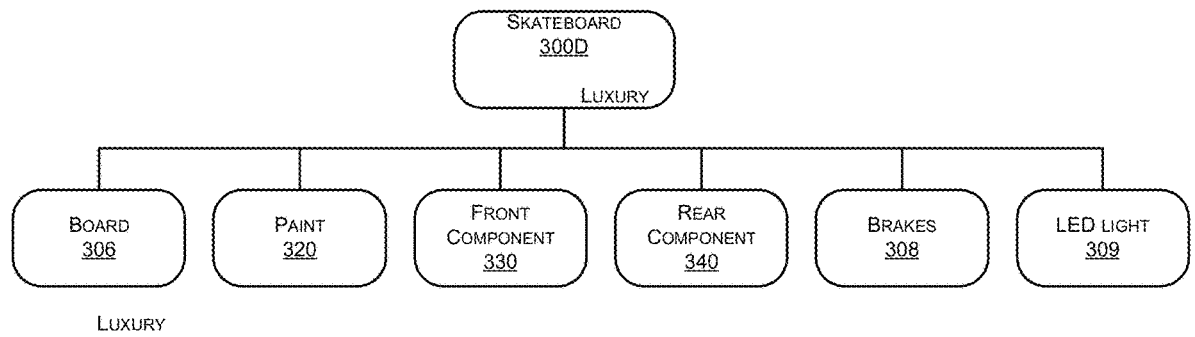

When accessing the system, the user can be presented with a spreadsheet like interface as shown in FIG. 3B that provides information such as manufacturing, engineering, and sales data sources. When a user goes to edit a given box or set of data presented in the spreadsheet, the proposed system tracks the relationships of the data to maintain the data integrity. For example, a particular part might have the following information associated with it: SKU, Sourcing Agent, Supplier(s), system(s) the part is used in, engineering team assigned to the system, name, revision level and so forth. If a particular supplier is going out of business and will no longer be providing that particular component, multiple users can interact with the project to ensure a new component, supplier, revision, and integration occur all while simultaneously working on the given task. Each user can be given certain permissions as to whether they can edit or view only the updates as they occur (see FIG. 3C). FIG. 3D shows revised relationship between fields based on dependency relationship between various stakeholders/parts/components. As the part is modified, those links of data dependencies, references and/or connections can be forwarded or transferred to the edited component. In this manner, the proposed system becomes more akin to 3D system where although the particular part or name has changed, the underlying dependencies, relationships, references, and connections have been maintained.

Another way of preserving these underlying relationships includes taking an 'immutable snapshot' at any given point during the history of changes process. Looking again at FIG. 3A, one can see various "Revisions" which are associated with the History of changes log. Each of these revisions can be queued as an immutable snapshot of all the given relationships, properties, references, sources, connections and so forth associated with each part in the given project and throughout other projects in the system. While the history of changes occurs, it allows those dependencies and relationships to be updated, but once an immutable snapshot is taken, those relationships are preserved in memory by the proposed system. These immutable snapshots can then later be referred to as needed to restore a previous set of relationships, or for any number of other reasons that would require those dependencies to remain in place.

It should be noted that when multiple users are accessing the same project, visual indicators can appear on the screen and the viewing of real-time updates is possible. Certain rules can be implemented, such as who can edit mentioned above, or others that include sequencing, any hierarchical controls, and notifications of changes.

For purposes of this application, a web browser may refer to a software application or display produced by steps performed by processing circuitry for retrieving, presenting, interpreting, and traversing information resources provided by a remote server (e.g., on the internet). At the time of this application, web browsers may include Chrome, Firefox, Internet Explorer, Opera, and Safari. In addition, a web application, also referred to as an application or "app" as described herein, includes computer software designed to help the user to perform specific tasks on a computer or using a mobile device. The application functions can be performed by processing circuitry such as a computer, a mobile device, or a server, as further described herein. For purposes of the systems and methods described herein, a plug-in may refer to a set of software components that adds specific abilities to a larger software application, such as a web browser. Plug-ins enable customizing the functionality of an application and may be implemented in any suitable architecture, such as a Flash player, Java applet, HTML5, or any other commonly used platform known in the art. For purposes of method, a plug-in is a general term that could also be synonymously associated with add-ons, snap-ins, and extensions. In certain contexts, the term "application" may also be used to describe a notification and/or response for an employment opportunity.

In one embodiment, when activated, the processing circuitry can record any changes in a project into a database and display a History of Changes in a browser panel powered by the plugin. The processing circuitry can also cause visual indicators on the display indicative of other users simultaneously viewing or editing the particular project or structured field associated therewith being viewed by the current user. The processing circuitry can retrieve information from one or more databases upon an inputted request from a user.

In an aspect, the proposed system described herein can be provided with one or more processing circuitry components, such as processors that access one or more databases stored locally or in networked (or cloud) based system. The processing circuitry can cause accessed information in the database to be outputted to a display or outputting device. Input devices, such as keyboards, monitors, touchscreens, mics, mice, and so forth can be used to cause the processing circuitry to perform a given task. As discussed above, the system can be configured to automatically store History of Changes, transfer data relationships through a multi-user editing process. Immutable snapshots of particular moments in the editing process can be recorded and later retrieved.

In an aspect, multiple users can interact with a single project, wherein, in an instance, a plurality of different users (design engineer, supply manager, contract manufacturing) can interact with the project through a revision process, wherein each user contributes to updating the project and those revisions are gathered and updated to a final output or stage, at which point an immutable snapshot could be taken. The history of changes for each user can be recorded and stored in a database. Information from the project can be pulled from a database including any previous immutable snapshots which the users may use.

It is important to understand for purposes of this application that simultaneous users can mean having multiple users having editing or viewing access to a particular project at the same time. It can mean simultaneously editing fields of data, information, documents and so forth; however, it is also intended to mean that a collaborative environment where multiple users can see the modifications occurring in real time and contribute (or not) accordingly. Often the changes that occur will occur sequentially. For example, as the design engineer is uploading a new schematic or part, the supply chain manager can see that and modify a quantity or supplier information shortly thereafter having viewed the changes. In this way, control of the project does not need to change hands or editing be facilitated from a single source.

Figure 4:
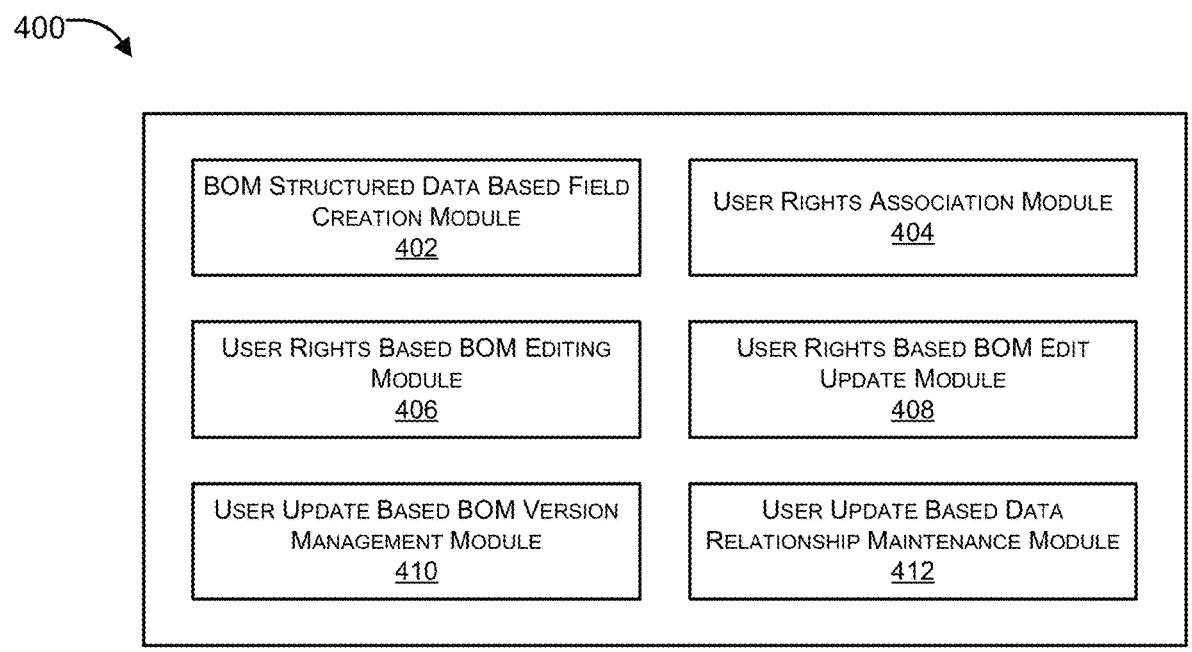
FIG. 4 illustrates an exemplary screenshot illustrative of exemplary functional modules for creation and management of a project and associated structured fields in accordance with an embodiment of the present disclosure.

FIG. 4 illustrates exemplary modules overview 400 of various functional modules for the creation and management of project in accordance with an embodiment of the present disclosure. In yet another aspect, the present disclosure relates to a multi-member collaboration and data management system (100, 300A), said system comprising a non-transitory storage device having embodied therein one or more routines operable to create and manage a project which is editable by one or more users; and one or more processors coupled to the non-transitory storage device and operable to execute the one or more routines, wherein the one or more routines include a user rights based project editing module 406, which when executed by the one or more processors, enables a first user to, based on rights assigned to the first user, edit the project, wherein the project comprises a plurality of structured fields, each of the plurality of structured fields having at least one defined property. In an aspect, such editing should be interpreted to include any action that a user takes on the project including, for instance, accessing and viewing one or more sections/fields of the project based on the rights which are assigned by the respective user. All such actions can be logged for the user and can be viewed anytime going forward by an administrator (or any other authorized user) on a user-level basis. Administrator can also, for instance, specify specific fields (such as part number), and for a date range review all actions that have been taken by multiple users on the specified fields during the date range.

The system of the present further includes a user rights-based project edit update module 408, which when executed by the one or more processors, updates/informs/intimates at least a second user of the editing done by the first user based on rights assigned to the second user, wherein the rights of the second user are at least for the sections or fields edited by the first user. For instance, if user A and B have editing/viewing rights over the field "part quantity", and user A saves an edit on the field, the system of the present disclosure can then intimate user B of such a change. Any user-level configuration of when and how such updates need to be given to different users having rights over specific fields/sections of the project is completely within the scope of the present disclosure.

In an aspect, a user update-based project version management module 410, which when executed by the one or more processors, saves a version of the project based on the editing done by the first user. Such versioning can be made on each update/edit or at predefined/pre-configured time-points/actions.

In an aspect, the rights can be assigned to enable the user to either edit or only view the project, or structured fields associated therewith. In another aspect, the rights can be assigned for editing or viewing a subset of the one or more sections of the project, or for editing or viewing of at least one field or subset of fields of the project.

In another aspect, the system of the present disclosure can further include a user update-based data relationship maintenance module 412, which when executed by the one or more processors, automatically, based the editing done by the first user, assesses impact of the editing and maintains data relationship across one or more sections and/or fields of the project based on the assessed impact. For instance, if part quantity impacts when the purchase request is to be issued for new parts, such dependency relationships are updated/assessed after each edit.

In an aspect, being collaborative, the present system allows a third user to edit one or more structured fields of the project simultaneous to the first user. In another aspect, the proposed system can further include a project structured data-based field creation module 402, which when executed by the one or more processors, enables at least one administrator to create the plurality of structured fields having corresponding properties for each field. Each field of the proposed project therefore has at least one property that defines the kind/type of data it stores, values it can accept, impact it creates on other fields, and relationships it has with other project sections.

The system of the present disclosure can also include a user rights association module 404, which when executed by the one or more processors, enables an administrator to assign rights to one or more users for editing or viewing of one or more sections of the project, or for editing or viewing of at least one field of the project.

In yet another aspect, the system can include a user activity history management module 416, which when executed by the one or more processors, manages user-level history of actions performed on the one or more structured fields associated with the project by each user having permissions associated with the fields of the project.

Figure 5B:
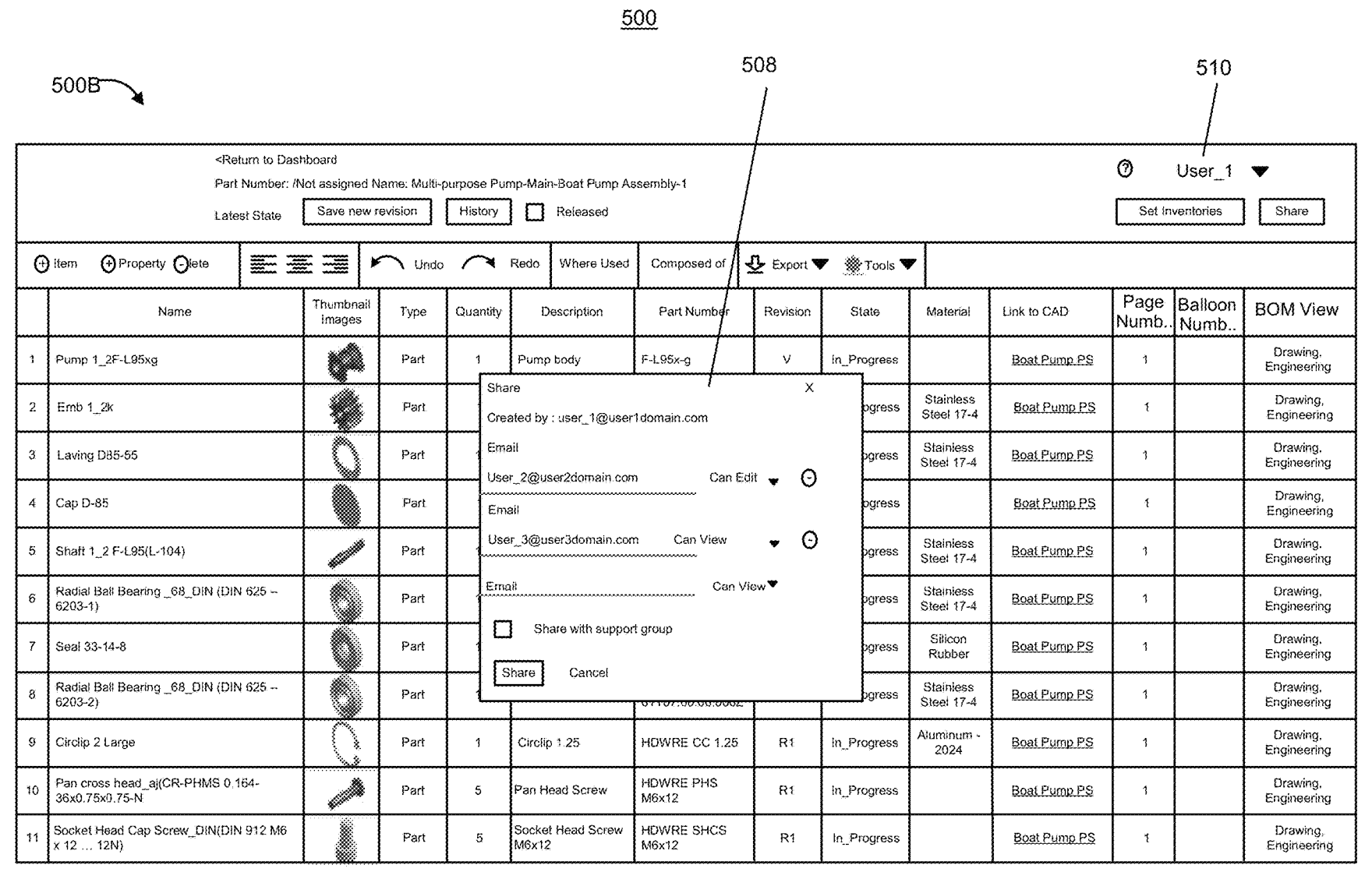
Figure 5D:
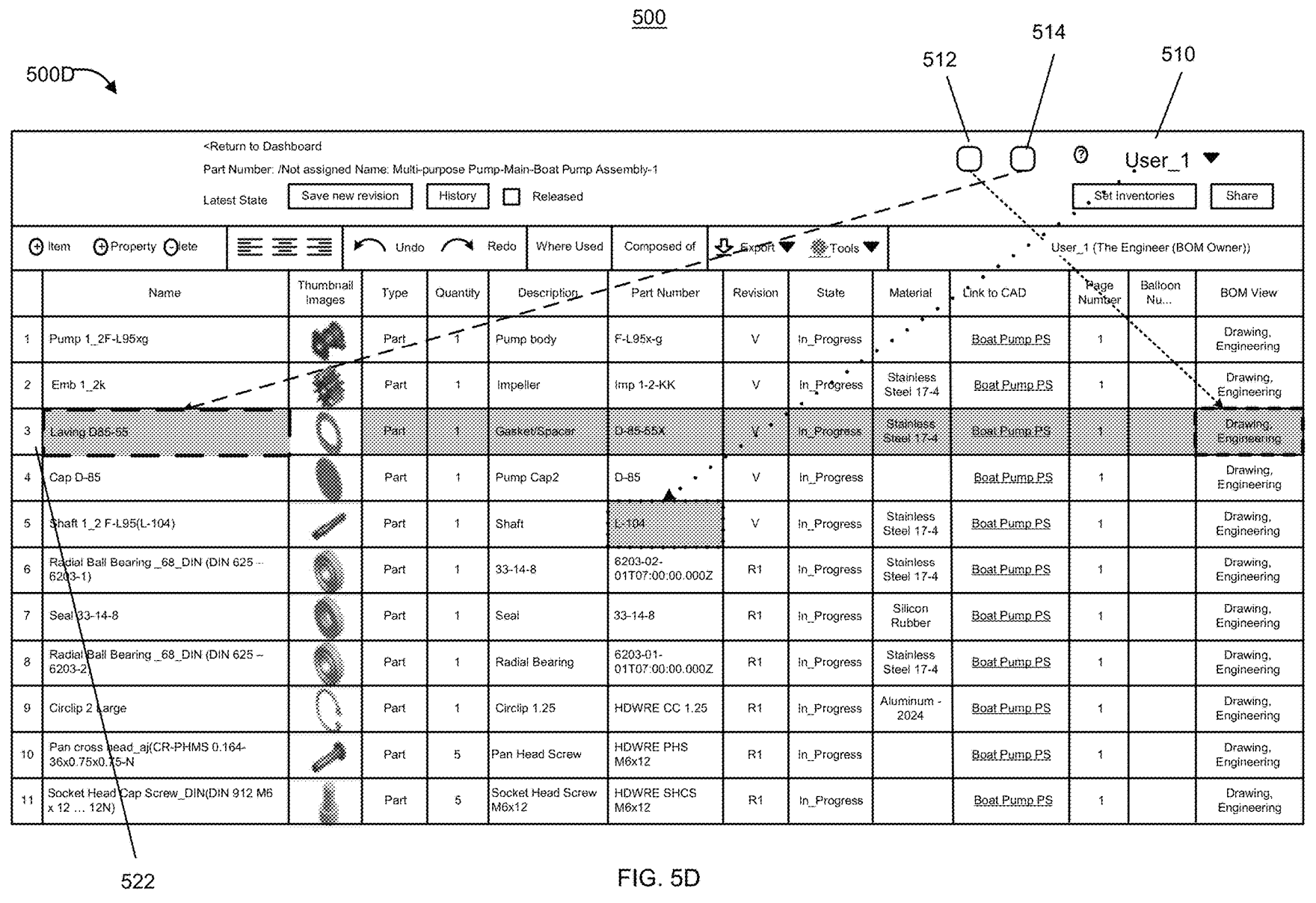
Figure 5E:
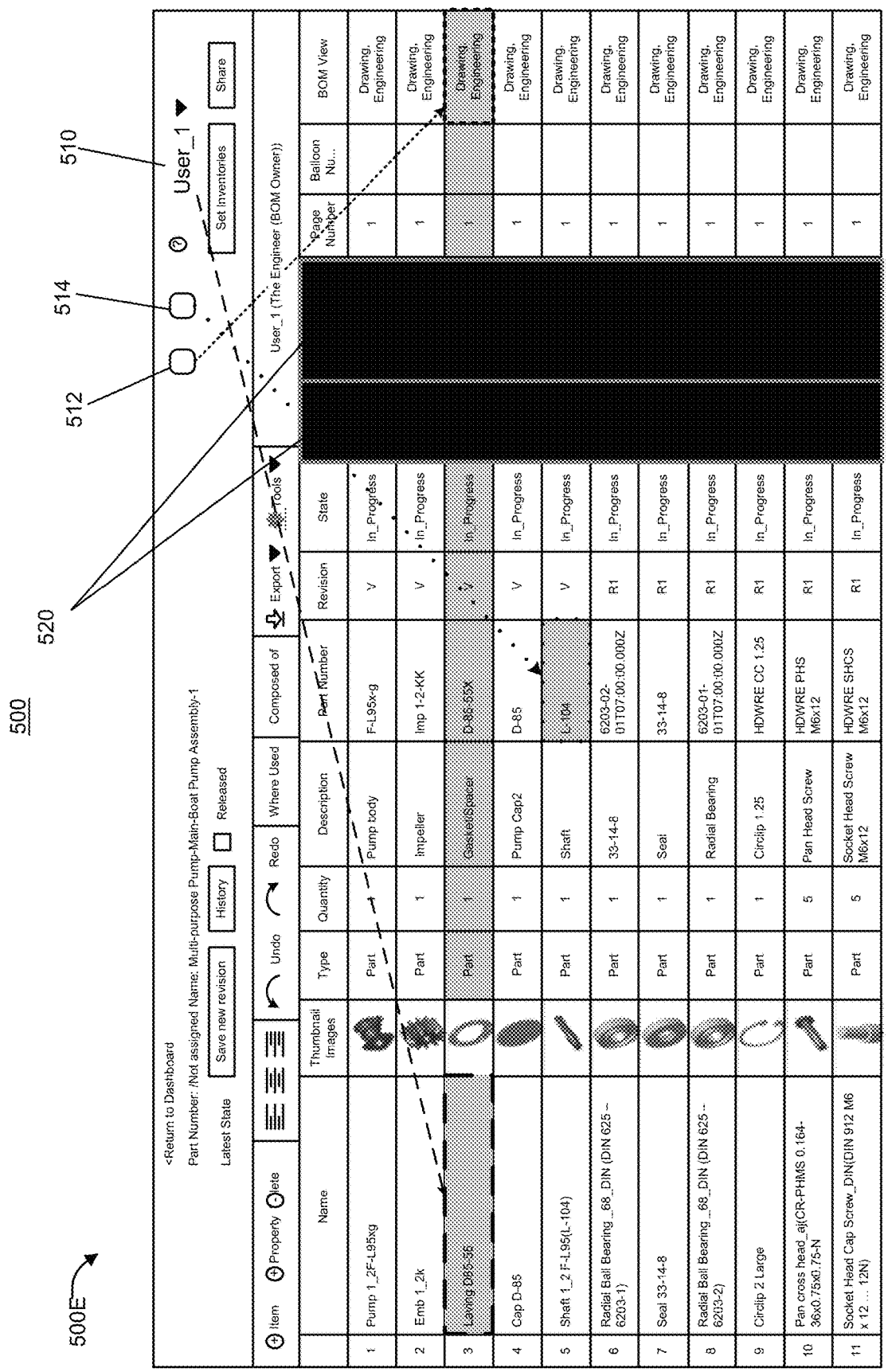

FIGS. 5A to 5E illustrate exemplary representations showing how a multi-member collaboration and data management system 500 can be created, edited, updated, and managed in accordance with an embodiment of the present disclosure. FIG. 5A illustrates an exemplary representation of a project interface 500A (or project sheet) showing multiple fields (such as name, image, type, quantity, description, etc.) and corresponding entries for each field for one or more parts/components that form part of the project. 500A shows a single user 510 accessing the project. FIG. 5B illustrates how user 510 can invite additional users 512 and 514 and granted each specific permission for read and/or write access for each particular structured field. In this particular embodiment, a pop-out window 508 in the project interface 500B allows user 510 to add users via e-mail or user identification and determine various permissions. These users can collaboratively update/edit in real-time whether they are remote or local. Such users can be across multiple organizations/entities or across departments of an organization. FIG. 5C shows how a project interface 500C can be viewed and shared across multiple users across departments/ entities, allowing them edit/view the project, or particular structured fields associated therewith, based on rights assigned to them. Each user, when logged in, can then be identified by a highlighting or other designated indicator around or in each field thus indicating to the other users what field a given user is specifically viewing or editing.

Figure 5F:
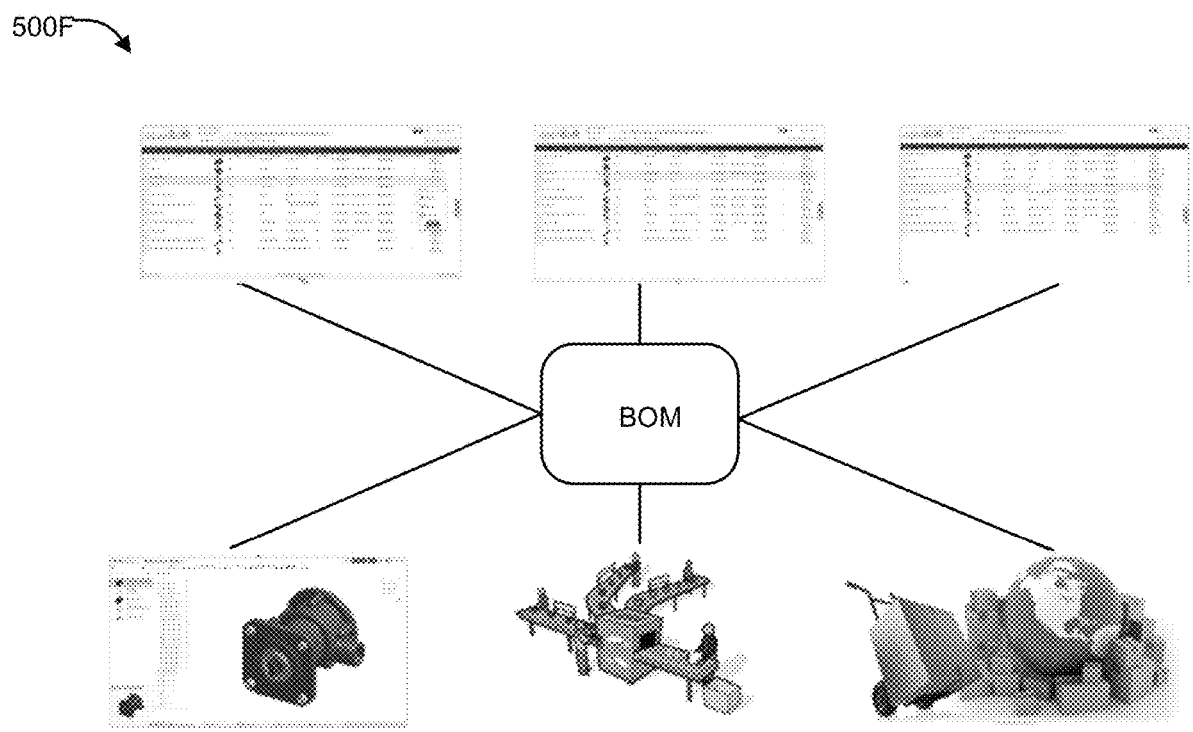

In a further aspect of permissions, although a user may be given an editing right, such right can be further be assigned/ configured such that it only allows the user to edit in a specific range or only for a specific part. FIG. 5D shows how a single row 522 of exemplary project interface 500D relating to a given part/component can be edited/updated by two or more users from same or different departments/ entities, allowing them edit/view the project based on rights assigned to them. In an aspect, although a user may be given an editing right, such right can be further be assigned/ configured such that it only allows the user to edit in a specific range or only for a specific part (row). For example, the user 512 may only be allowed to edit the quantity from 5-40, or only replace parts on a bill of materials having a cost less than a specific value, and not outside this range. Editing rights therefore may also be further limited based on administrator configuration. Sharing of project permissions can only be done by a user that has the necessary rights to do so. FIG. 5E shows how some users can be granted a selected viewing of the project interface 500E. As illustrated certain columns 520 are completely blocked out; however, it should be understood that another way of implementing this is to merely not have those columns or fields show up (whether blocked out or not) on that particular user's screen or portal altogether. FIG. 5F illustrates an exemplary instance 500F showing how different users having defined roles can be a part of the proposed system and be assigned specific viewing/editing rights. All changes to the project in various aspects of the present invention can be versioned automatically and history be maintained at a user level to enable complete access/assessment of how the project has evolved over a defined period of time, how different users have taken actions, kind of actions taken, impact of such actions on entities/departments/users, and how data relationships between entries/fields/components/parts have refined.

Figure 6:
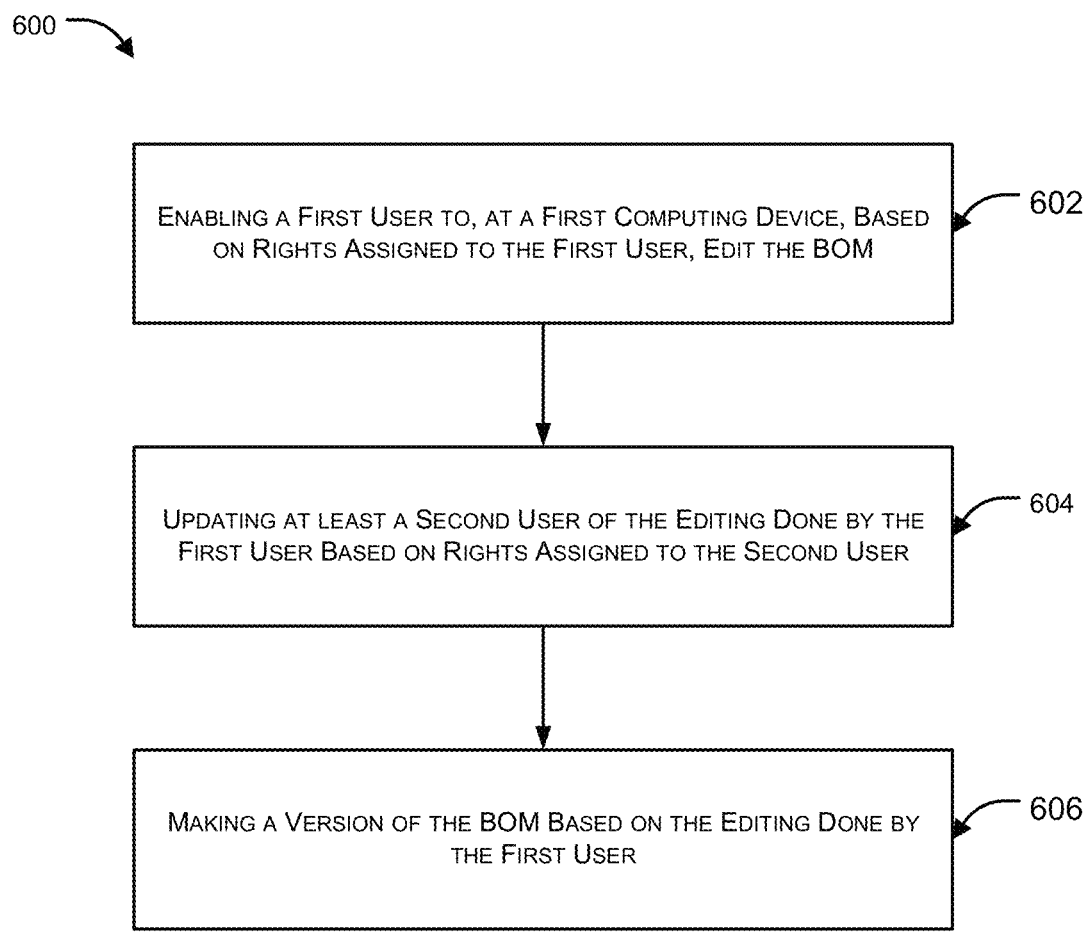
FIG. 6 illustrates an exemplary flow diagram showing creation and management of a project and associated structured fields in accordance with an embodiment of the present disclosure.

FIG. 6 illustrates an exemplary flow diagram showing creation and management of a project in accordance with an embodiment of the present disclosure. As shown, a method 600 of the present disclosure comprises the steps of, enabling a first user to, at a first computing device, based on rights assigned to the first user, edit one or more structured fields of the project, wherein fields, each of the plurality of structured fields having at least one defined property 602; updating at least a second user of the editing done by the first user based on rights assigned to the second user, wherein the rights of the second user are at least for the sections or fields edited by the first user 604; and, saving a version of the project based on the editing done by the first user 606.

In an aspect of the invention, the rights can be assigned to enable the user to either edit or only view the project. Rights can further be assigned for editing or viewing of one or more specific sections of the project, or for editing or viewing of at least one field of the project.

In another aspect, the proposed method can further include the step of automatically, based on the editing done by the first user, assessing impact of the editing and maintaining data relationship across one or more sections and/or fields of the project based on the assessed impact.

In another aspect, the proposed method can further include an initial step of enabling at least one administrator to create the plurality of structured fields having corresponding properties for each field. Post such creation of structured fields, the method can enable an administrator to assign rights to one or more users for editing or viewing of one or more sections of the project, or for editing or viewing of at least one field of the project.

In an aspect, the proposed method can include the step of managing user-level history of actions performed on the project by each user of the project.

In an aspect, the plurality of structured fields can be selected from any or a combination of part name, part usage, part quantity, part price, part image, part type, part description, part number, part unique identifier, revision, state, material, product that the part forms part of, manufacturer information, supplier parameters, and part attributes.

Figure 7:
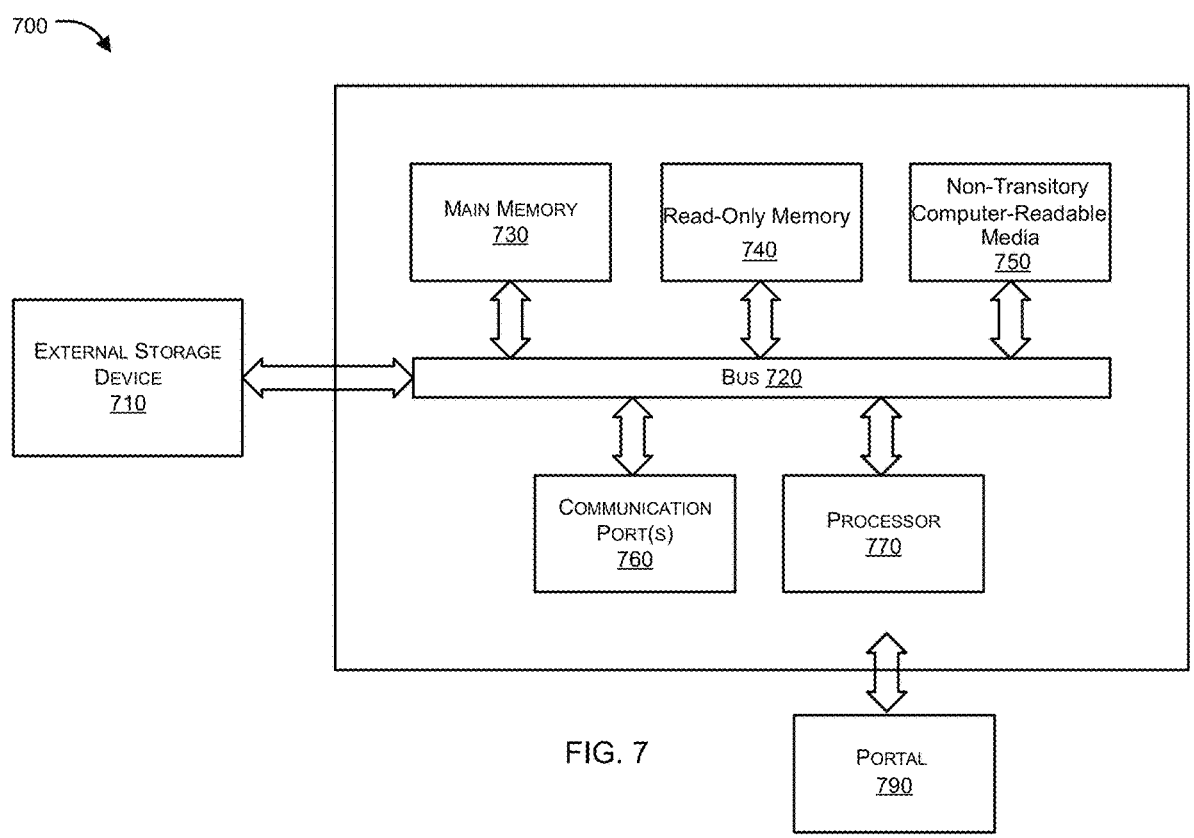
FIG. 7 illustrates an exemplary computer system in which or using which aspects of the present disclosure can be implemented.

FIG. 7 illustrates an exemplary computer system in which or using which aspects of the present disclosure can be implemented. Computer system 700 includes a bus 720 or other communication mechanism for communicating information, and a processor 770 coupled with bus 720 for processing information. Computer system 700 can also include a main memory 730 or other non-transitory computer-readable medium, such as a random-access memory (RAM) or other dynamic storage device, which can then be coupled to bus 720 for storing information and instructions to be executed by processor 770. Main memory 730 also may be used for storing temporary variables or other intermediate information during execution of instructions to be executed by processor 770. Computer system 700 may further include a read only memory (ROM) 740 or other static storage device coupled to bus 720 for storing static information and instructions for processor 770. A data/ external storage device 710, such as a magnetic disk or optical disk, is provided and coupled to bus 720 for storing information and instructions.

Computer system 700 may be coupled via bus 720 to a display (not shown), such as a cathode ray tube (CRT), for displaying information to a user. An input device (not shown), including alphanumeric and other keys, can be coupled to bus 720 for communicating information and command selections to processor 770. Another type of user input device can be cursor control, such as a mouse, a trackball, or cursor direction keys for communicating direction information and command selections to processor 770 and for controlling cursor movement on display. This input device typically has two degrees of freedom in two axes, a first axis (e.g., x) and a second axis (e.g., y), that allows the device to specify positions in a plane.

The invention is related to the use of computer system 700 for creation and management of projects as elaborated above. According to some embodiments of the invention, such use may be provided by computer system 700 in response to processor 770 executing one or more sequences of one or more instructions contained in the main memory 730. Such instructions may be read into main memory 730 from another computer-readable medium, non-transitory computer-readable media 750. Execution of the sequences of instructions contained in main memory 730 causes processor 770 to perform the process steps described herein. One or more processors in a multi-processing arrangement may also be employed to execute the sequences of instructions contained in main memory 730. In alternative embodiments, hard-wired circuitry may be used in place of or in combination with software instructions to implement the invention. Thus, embodiments of the invention are not limited to any specific combination of hardware circuitry and software.

Various forms of computer-readable media may be involved in carrying one or more sequences of one or more instructions to processor 770 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 720 can receive the data carried in the infrared signal and place the data on bus 720. Bus 720 carries the data to main memory 730, from which processor 770 retrieves and executes the instructions. The instructions received by main memory 730 may optionally be stored on the non-transitory computer-readable media 750 either before or after execution by processor 770.

Computer system 700 also includes a communication interface 760 coupled to bus 720. Communication interface 760 can provide a two-way data communication coupling to a network link (not shown) that can be connected to a local network (not shown). For example, communication interface 760, may be an integrated service digital network (ISDN) card or a modem to provide a data communication connection to a corresponding type of telephone line. As another example, communication interface 760 may be a local area network (LAN) card to provide a data communication connection to a compatible LAN. Wireless links may also be implemented. In any such implementation, communication interface 760 sends and receives electrical, electromagnetic or optical signals that carry data streams representing various types of information.

The processing circuitry can then track any changes to the project tasks, i.e. approvals, changes in task assignments, required tools, parts components, and display a history of any such changes via a portal 790, which can be provided in various means, such as over a network, through a web browser, or any other display or portal means through which potential users can then interact with the system.

It should be readily apparent that the system as described herein can be utilized to track and facilitate at least one or more of the following: a collaborative BOM system, a collaborative purchasing system, a collaborative marketing strategy, a collaborative product management system, a collaborative case management system, a collaborative risk assessment system.

In some instances of the previously existing methods of approving a given project or task. The task or project can be prepared by a member of the team, when they feel it is ready for approval, it is submitted to another member of the team that signs off on the task. In some companies or organizations, multiple members often get involved to sign off on a given project. For example, a design presents a concept that needs approval from engineering, but also manufacturing, as well the finance department from a cost perspective, and even sales or marketing member. Each of these members often has a unique skill set, which is why they work together as a team when moving any given project or task forward. If the task has to go through the cycle with each specified manager then one can easily see how this iterative process can take a lot of time. In some cases, the updates and number of presentations may be multiplied, because a change for one manager might conflict with a request of another manager.

In attempt to streamline the approval process, a common interface can be presented to allow for multiple members or collaborators involved in a decision-making process, such as the flowchart illustrated in FIG. 8 demonstrate. Through a commonly displayed interface or portal, multiple members or collaborators can simultaneously view the project and associated tasks, in this collaborative setting approvals or other changes can then be instantly made as well as instant and viewed by the plurality of users in concert. For example, a member of the finance group can weigh in on the process and as soon as the financial numbers meet their expectations an approval can be made. This approval can come in the form of a checkbox or other indication means. The financial member of the team can leave the collaboration as soon as his/her portion is satisfied. Alternatively, the financial group member can view multiple projects simultaneously and likewise accept or signoff on multiple projects at once, while being in collaboration with members across multiple projects. If edits or requests for changes need to be made they can be made in real-time with other members of the team. Those changes may not necessarily require another member to implement and can be edited or modified directly by the specified manager. For example, sales require additional quantities and can see the supplier and manufacturing has the capacity to increase volume. Instead of discussing with the supplier and then with manufacturing individually sales can sign off and have the action proceed.

This above example, provides an example of one of the type of rules that can be implemented through this multi-member collaborative decision making system. The rule described above allows individual managers/users to set criteria within their approval process and in some cases pre-approve a project, so long as those criteria are met. Returning to the finance member example, the finance member can set a rule that allows for a set of X number of projects to be approved so long as the cost for each project doesn't exceed a specified amount and/or the cost of the projects in aggregate don't exceed a preset limit. If a situation occurs where the pre-approval isn't satisfied then a review by the finance member becomes necessary. Similar examples with engineering constraints or time to manufacture guidelines could also be implemented.

The permissions and views for each member can be accessible based on permissions for the given member.

Figure 9:
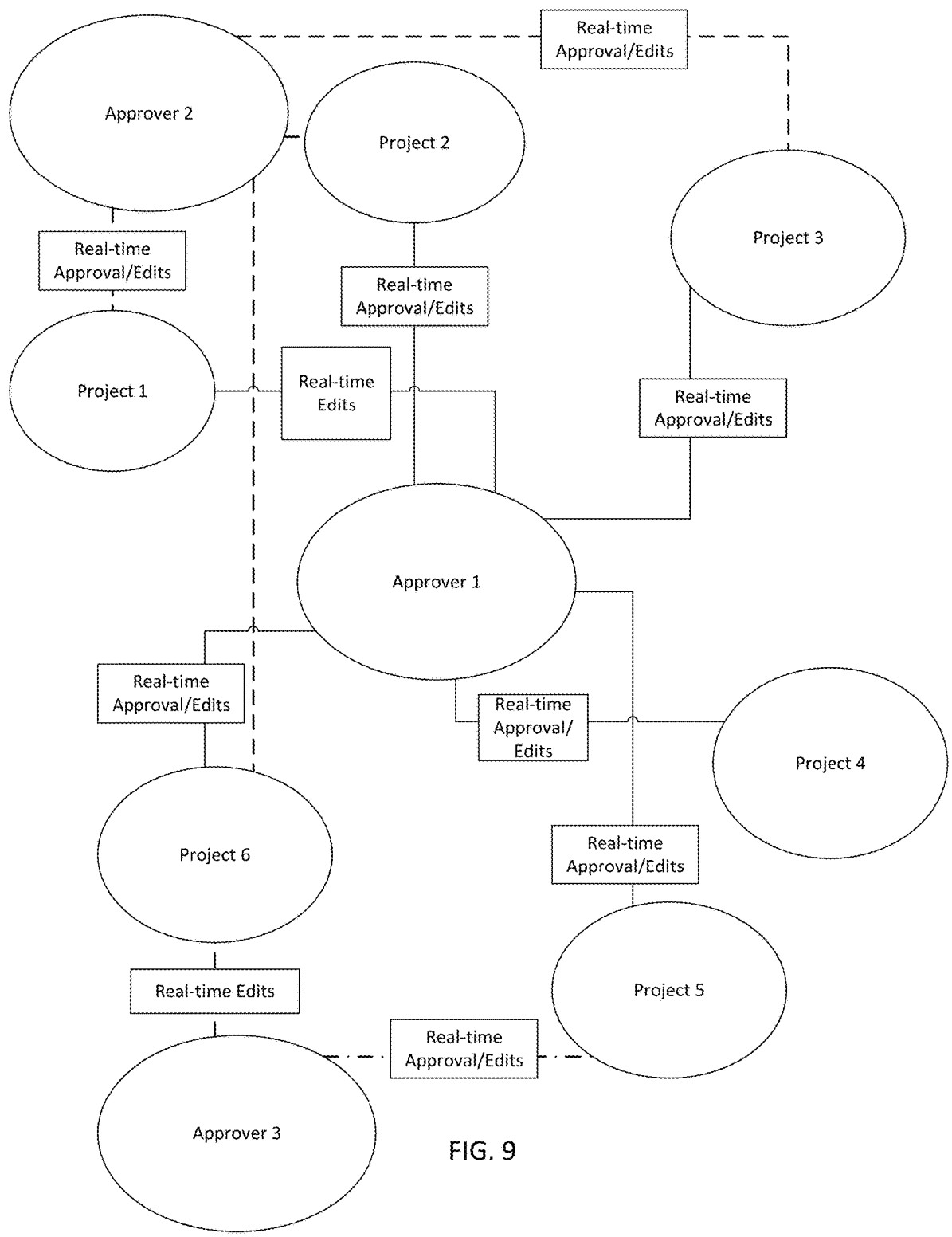
FIG. 9 illustrates a flowchart or schematic of a multi-member management decision making system and method illustrating various decision structures and how they might overlap across multiple projects.

FIG. 9 illustrates a flowchart or schematic of a multi-member management decision making system and method where decisions overlap multiple projects. As shown, Approver 1 has collaborative decision-making process decisions with Approver for projects 1, 2, 3, and 6. Similarly Approver 1 has overlaps with Approver 3 for projects 5 and 6. Each Approver can approve and/or modify a given project they are associated with and see whether or not another Approver is currently working on that project, offline, approval or non-approval, pending questions, as well as their latest editions and revisions.

It should be understood that multi-member collaborative system is implement over a network, where each user can access via a portal, i.e. 790, such as a computer or smartphone or through a browser provided thereon, the databases providing information to a user interface. Based on the user's permissions, as can be determined based on the user's login credentials or user profile, a display of given projects or tasks is displayed, along with information regarding other collaborative members accessing or viewing the same information. As discussed above, approvals for various tasks or shown in an approved or unapproved state. One or more processors receive instructions from the user and implement the instructions in the form of retrieving, editing, viewing information associated with a particular project or database. The information can be retrieved by the process from one or more databases via the network and displayed through the user portal. The one or more processors can automatically detect associations with users logged into the system and display in real-time the actions of each group of users to others in the group of users. Furthermore, the one or more processors can update the one or more databases in real-time.

Figure 10:
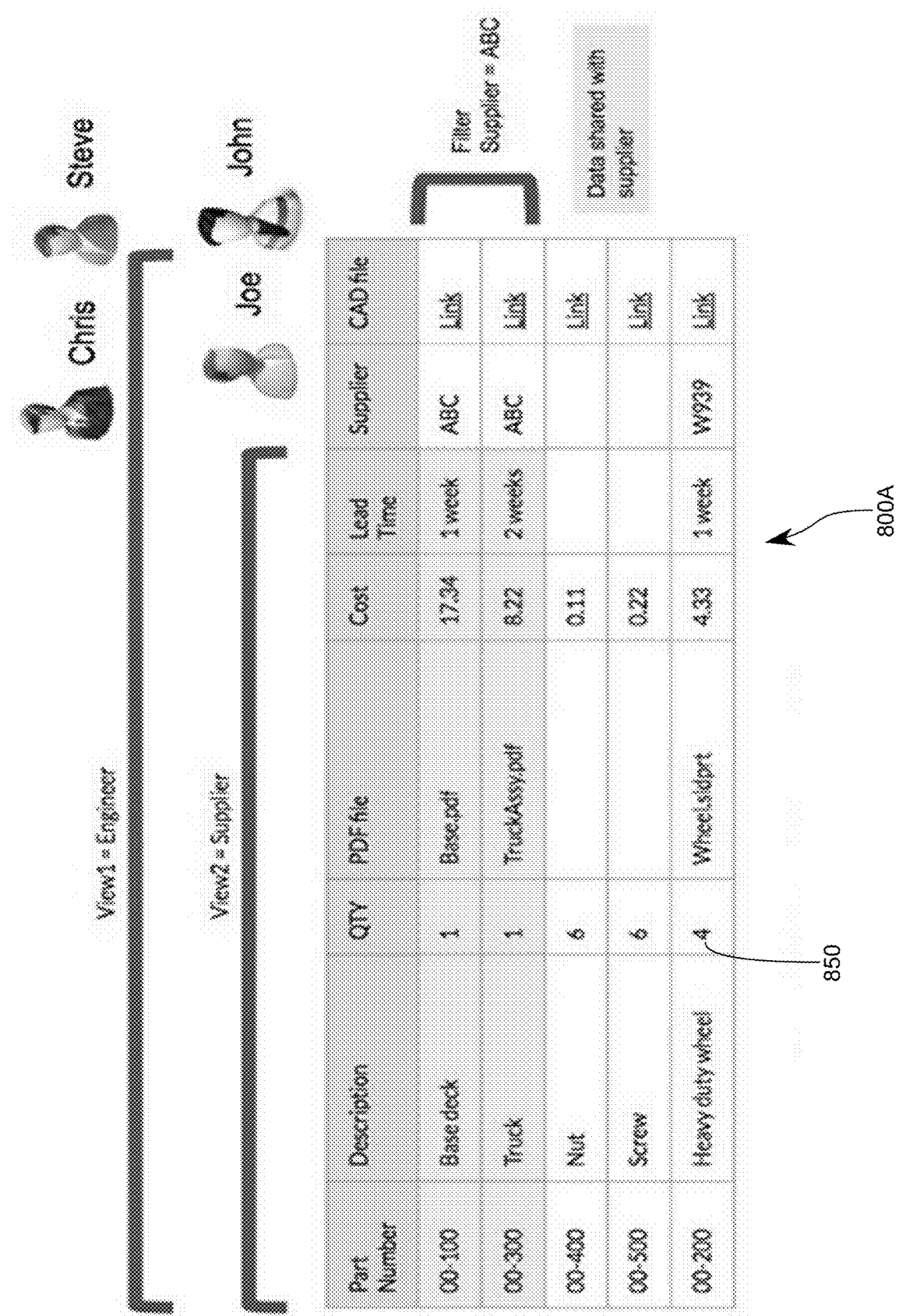
FIG. 10 illustrates screenshot from an exemplary access or editing portal illustrating a particular project with a plurality of associated structured fields being illustrative of various viewing permissions between users.
Figure 11A:
FIG. 11A illustrates an exemplary screenshot from an exemplary access or editing portal illustrating a first user's view of the particular project of FIG. 10 with a plurality of associated structured fields.
Figure 11B:
FIG. 11B illustrates an exemplary screenshot from an exemplary access or editing portal illustrating a second user's view of the particular project of FIG. 10.

FIG. 10 illustrates yet another exemplary portal 800A with a project and an associated master structured field matrix 850 as viewed by a first user having various administrative permissions for all structured fields, or in other words, having permissions to view, edit, and change permissions for all structured fields for all other users. As illustrated, various other users can include one or more members of an Engineering team, wherein when the structured field matrix was created columns 1-8 the creator or administrator allowed for everyone on the engineering team, i.e. Chris and Steve, to view, and perhaps edit, all the columns, however, when the structured field matrix was created the Supplier group, which includes Joe and John, were only permitted to see columns 1-6 and rows 1-3. As such, FIG. 11A illustrates how when the engineering team views the project through their own portal the members of the team can view all of the columns and rows, whereas FIG. 11B illustrates how the supplier team or group, when viewing the project through their own associated portal, can only view columns 1-6 and rows 1-3 of the project's master structured field matrix 850.

Figure 12:
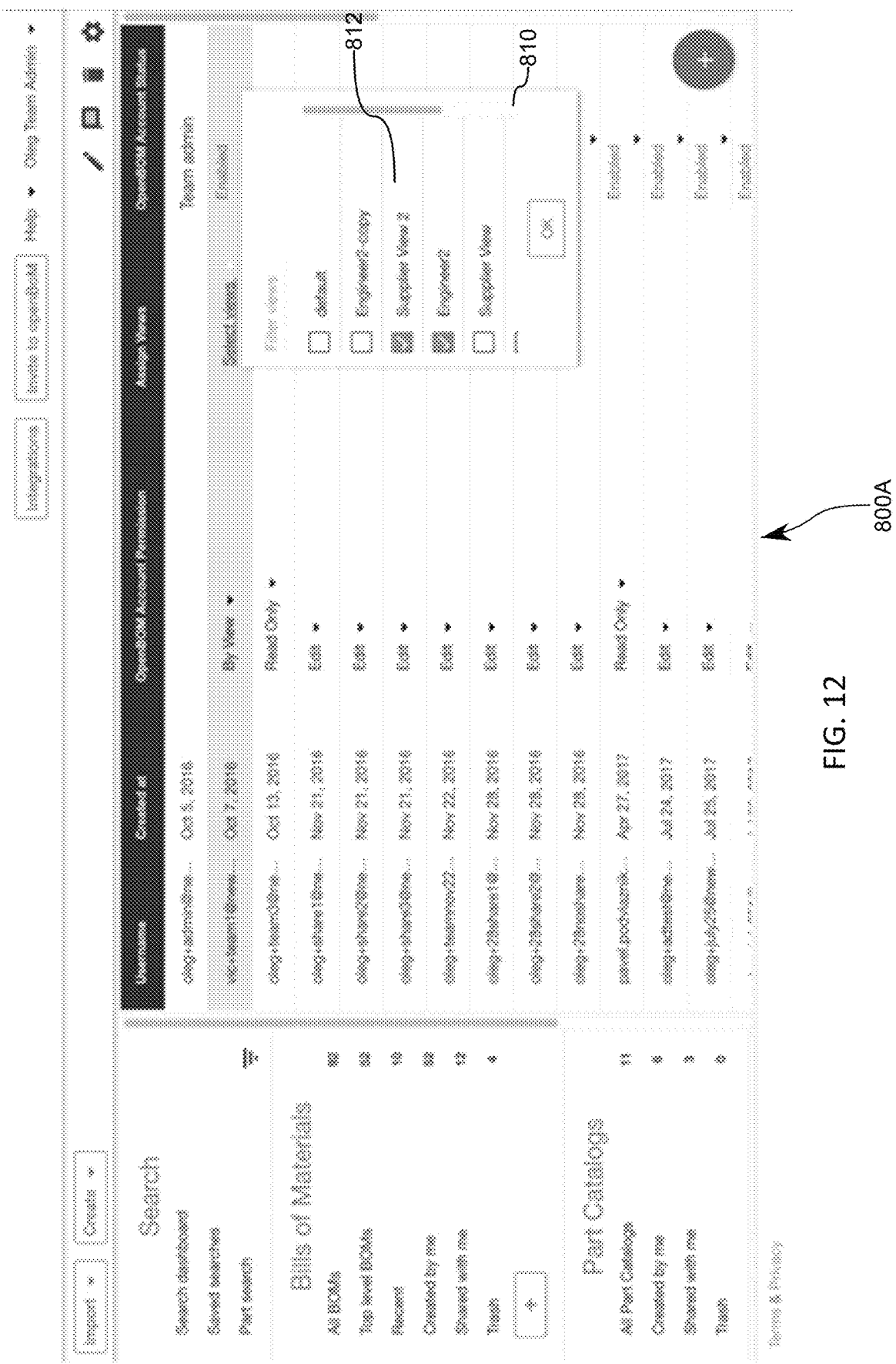
FIG. 12 illustrates screenshot from an exemplary access or editing portal illustrating a particular project with a plurality of associated structured fields and an exemplary option and method of assigning various permissions of various individuals for each structured field.

FIG. 12 illustrates an exemplary screenshot of an administrator view of a project having a plurality of structured fields. In this exemplary embodiment each structured field can be selected, and a dropdown menu 810 can be presented with a plurality of available permissions 812 for each field, as illustrated in FIG. 12. The available permissions can include known groups of individuals, and an option for read/write/control, or ability to grant additional permissions for each structured field. It will also be appreciated that new customized permissions can be created and saved so as to form new groups, new permission presets, etc. for future use.

Figure 13:
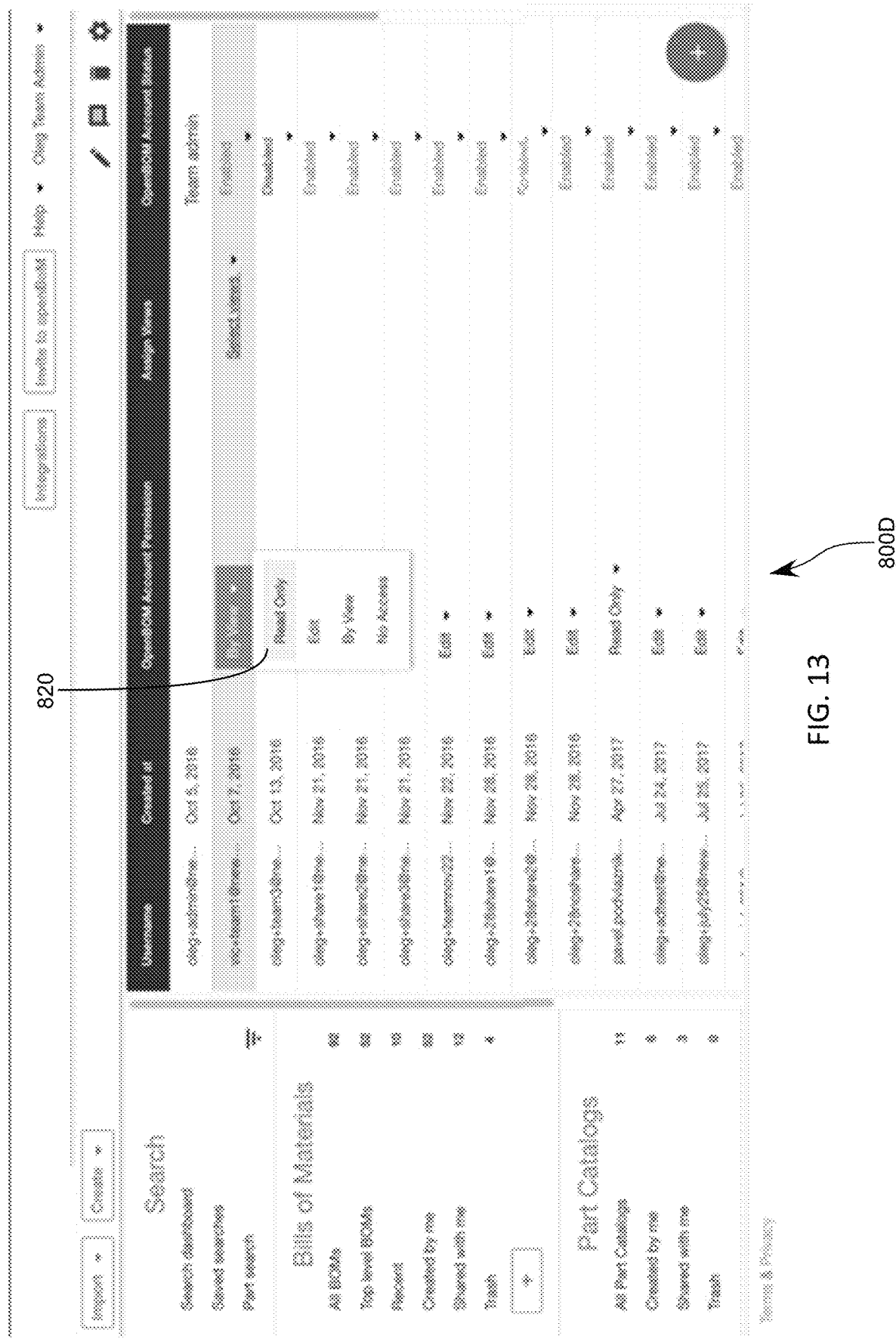
FIG. 13 illustrates screenshot from an exemplary access or editing portal illustrating a particular project with a plurality of associated structured fields and various exemplary display options.

FIG. 13 illustrates an exemplary screenshot of a user portal 800D wherein additional drop-down menu 820 illustrative of various filtering options which may be utilized so as to arrange the user's view of projects based on the granted permissions, or alternatively based on granted permissions of particular structured fields. It should be appreciated that the structured fields can be filtered and displayed based on virtually any of the grantable permissions, group members, date of edit, etc.

Figure 14:
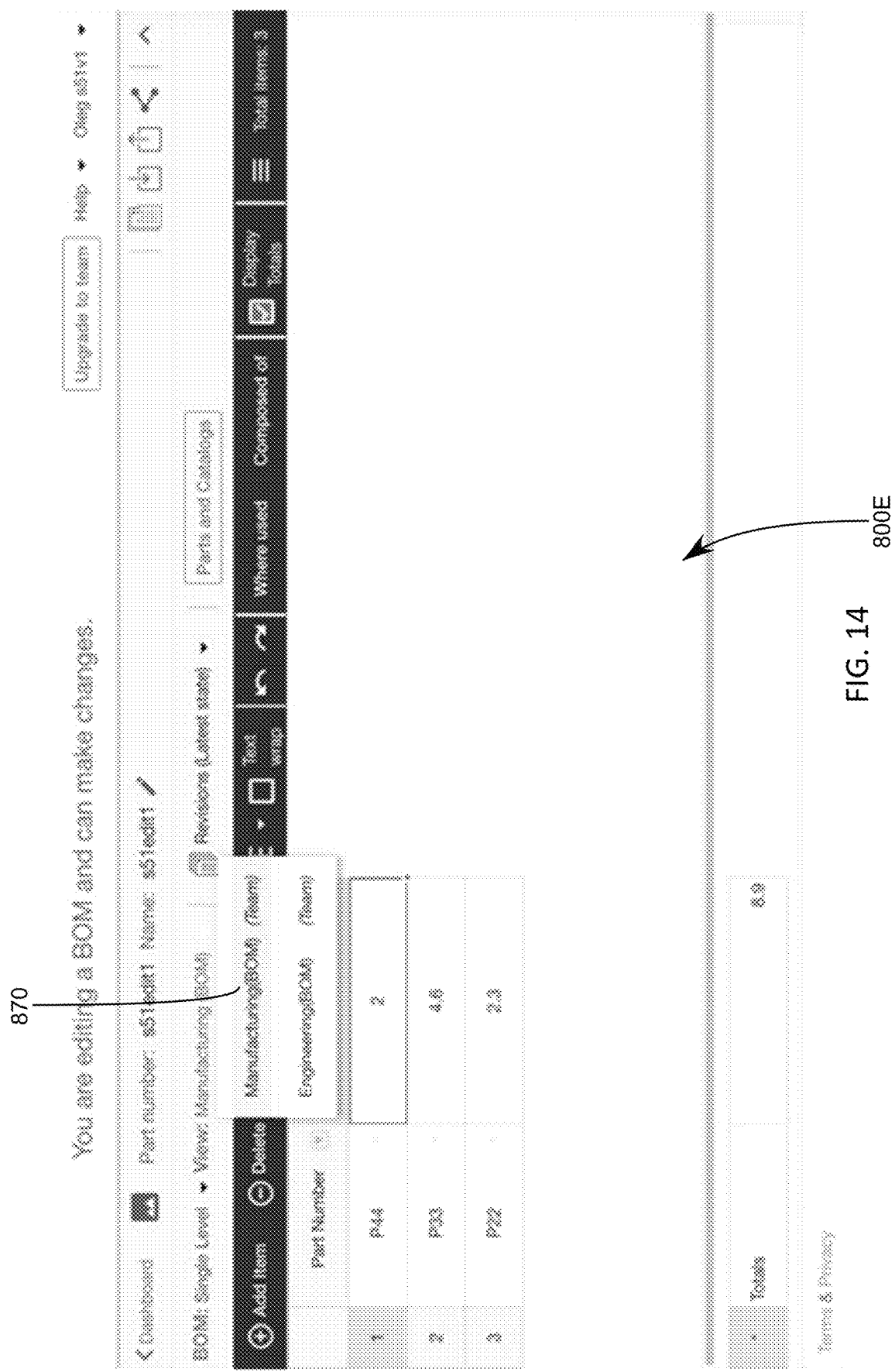
FIG. 14 illustrates screenshot from an exemplary access or editing portal illustrating a particular project with a plurality of associated structured fields and various additional exemplary display options with regard to determining permissions on viewable structured fields.

FIG. 14 illustrates yet another exemplary screenshot of an alternative view user portal 800E of a particular user who has permissions granted based on membership within a plurality of different groups or teams. In this particular embodiment the portal can include a selection menu which can be utilized for selecting between one or more potential options for utilizing the portal as a member of one, or all, of the particular groups to which the user belongs. It will be appreciated in some circumstances, such as while screen sharing with alternative users or non-users, external contractors, new potential contractors, etc. that in some instances a particular user may find themselves in situations where a need to display information regarding the project to such an alternative person without divulging unnecessary information or otherwise shielding sensitive information which may be contained in one or more structured field. In such a case various group selections or alternative viewing options can be saved in a viewing profile in which the particular user can view the portal through a filtered lens as though they were a member of a particular team, group, etc. as saved in the selectable viewing profile.

It should be apparent to those skilled in the art that many more modifications besides those already described are possible without departing from the inventive concepts herein. The inventive subject matter, therefore, is not to be restricted except in the spirit of the appended claims.

As used herein, and unless the context dictates otherwise, the term "coupled to" is intended to include both direct coupling; in which two elements which are coupled to each other contact each other, and indirect coupling; in which at least one additional element is located between the two elements. Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

The term "computer-readable medium" as used herein refers to any medium that participates in providing instructions to processor 770 for execution. Such a medium may take many forms, including but not limited to, non-volatile media, volatile media, and transmission media. Non-volatile media, which includes, for example, optical or magnetic disks, such as non-transitory computer-readable media 750. Volatile media includes dynamic memory, such as main memory 730. Transmission media includes coaxial cables, copper wire and fiber optics, including the wires that comprise bus 720. Transmission media can also take the form of acoustic, radio, near field communication, wi-fi, Bluetooth, or light waves, such as those generated for the purposes of various commonly used wireless transmissions.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps which are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While various embodiments of the present disclosure have been illustrated and described herein, it will be clear that the disclosure is not limited to these embodiments only. Numerous modifications, changes, variations, substitutions, and equivalents will be apparent to those skilled in the art, without departing from the spirit and scope of the disclosure, as described in the claims.

I claim:

1. A multi-member collaboration and data management system, said system comprising:
    a non-transitory computer-readable media containing a set of computer instructions; a plurality of user profiles associated with a plurality of users, and one or more projects having a plurality of structured fields associated therewith, wherein the computer instructions are configured to create and manage the plurality of projects and the plurality of structured fields associated therewith, each structured field having properties including a plurality of permissions associated with a plurality of associated user profiles, wherein the computer instructions are operable to create and manage at least one collaborative process system that is editable by a plurality of users, each user being associated with one of the plurality of user profiles;
    one or more processors coupled to the non-transitory storage device and operable to execute the computer instructions and manage the plurality of permissions;
    a communication network coupled to the one or more processors; and
    a plurality of portals configured to allow for each user to simultaneously view one or more of the plurality of structured fields associated with a particular project therethrough;
    wherein the one or more computer instructions include instructions for the one or more processors to perform the following tasks:
        provide a user rights-based management editing module, which when executed by the one or more processors, enables a first user to, based on rights assigned to the first user, edit the management system, and approve projects assigned to additional users, wherein the management system comprises a plurality of structured fields, each of the plurality of structured fields having at least one defined property, wherein each defined property is associated with at least one of the one or more permissions;
        provide a user rights-based management system editing update module, which when executed by the one or more processors, updates at least one of the additional users of the editing done by the first user based on rights assigned to the additional user, wherein the rights of the second user are at least for a portion of the sections or fields edited by the first user; and
        display any edits made by each of the users to the plurality of portals as accessed by each user in real-time.

2. The multi-member collaboration and data management system management of claim 1, wherein the permissions of each structured field are customized for each individual user.

3. The multi-member collaboration and data management system management of claim 2, wherein the permissions of each structured field include at least permissions pertaining to each individual user's ability to either edit or view the particular structured field.

4. The multi-member collaboration and data management system management of claim 1, wherein the system further comprises a user update-based data relationship maintenance module, which when executed by the one or more processors, automatically, based on editing done by the first user, assesses impact of the editing and maintains data relationship across one or structured fields of the project based on the assessed impact.

5. The multi-member collaboration and data management system management of claim 1, wherein the processors are configured to allow a particular user to edit each of the structured fields simultaneously with an alternative user.

6. The multi-member collaboration and data management system management of claim 1, wherein the system further comprises a project structured data-based field creation module, which when executed by the one or more processors, enables at least one administrator to create the plurality of structured fields having corresponding permissions for each field, wherein the administrator can retain all permissions for editing, viewing, and granting permissions to alternative users.

7. The multi-member collaboration and data management system management of claim 1, wherein the system further comprises a user rights association module, which when executed by the one or more processors, enables an administrator to assign rights to one or more users for editing or viewing all of the one or more structured fields of the project, or for editing or viewing only selected structured fields of the project.

8. The multi-member collaboration and data management system management of claim 1, further comprising a user activity history management module, which when executed by the one or more processors, manages and displays to the portal a user history of actions performed on each of the structured fields by each user having made edits to the structured fields.

9. The multi-member collaboration and data management system management of claim 1, wherein the one or more structured fields displayed on a particular user's portal are filtered so as to show only structured fields to which the user has granted permissions to view each particular structured field viewed.

10. The multi-member collaboration and data management system management of claim 3, wherein the one or more structured fields displayed on a particular user's portal are filtered so as to show only structured fields to which the user has granted permissions to view each particular structured field viewed.

11. The multi-member collaboration and data management system management of claim 1, wherein the one or more user profiles can be categorized into one or more teams, wherein the one or more permissions can be granted to teams having a plurality of associated user profiles.

12. The multi-member collaboration and data management system management of claim 1, wherein the one or more structured fields displayed on a particular user's portal are filtered so as to show only structured fields to which the user has granted permissions to view each particular structured field viewed.

13. The multi-member collaboration and data management system management of claim 1, a corresponding indicator can be provided to alternative users when a user is actively editing information contained in a structured field.

14. A multi-member collaboration and data management system, said system comprising:
- a non-transitory computer-readable media containing a set of computer instructions; a plurality of user profiles associated with a plurality of users, and one or more projects having a plurality of structured fields associated therewith, wherein the computer instructions are configured to create and manage the plurality of projects and the plurality of structured fields associated therewith, each structured field having properties including a plurality of permissions associated with a plurality of associated user profiles, wherein the computer instructions are operable to create and manage at least one collaborative process system that is editable by a plurality of users, each user being associated with one of the plurality of user profiles;
- one or more processors coupled to the non-transitory storage device and operable to execute the computer instructions and manage the plurality of permissions;
- a communication network coupled to the one or more processors; and
- a plurality of portals configured to allow for each user to simultaneously view one or more of the plurality of structured fields associated with a particular project therethrough;

wherein the one or more computer instructions include instructions for the one or more processors to perform the following tasks:
- provide a user rights-based management editing module, which when executed by the one or more processors, enables a first user to, based on rights assigned to the first user, to update, share or view data associated with a first plurality of structured fields, and wherein a second user that has been granted permissions to update, share or view the first plurality of structured fields by the first user when executed by the one or more processors enables the second user to create, update, share or view a second plurality of structured fields and grant permissions to a third user to create, update, share or view a third plurality of structured fields; and
- display any edits made by each of the users to the plurality of portals as accessed by each user in real-time.

15. The multi-member collaboration and data management system of claim 14, wherein one or more structured fields within the first plurality of structured fields, second plurality of structured fields, and third plurality of structured fields may be associated with one or more of the first plurality of structured fields, second plurality of structured fields, and third plurality of structured fields associated with the first user, second user and third user respectively.

* * * * *